United States Patent
Aiba et al.

(10) Patent No.: US 9,894,642 B2
(45) Date of Patent: *Feb. 13, 2018

(54) COMMUNICATION METHOD, MOBILE STATION APPARATUS, BASE STATION APPARATUS AND MOBILE COMMUNICATION SYSTEM

(71) Applicant: SHARP KABUSHIKI KAISHA, Osaka-shi, Osaka (JP)

(72) Inventors: Tatsushi Aiba, Sakai (JP); Shohei Yamada, Sakai (JP); Shoichi Suzuki, Sakai (JP)

(73) Assignee: SHARP KABUSHIKI KAISHA, Osaka (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/234,473

(22) Filed: Aug. 11, 2016

(65) Prior Publication Data

US 2016/0353431 A1 Dec. 1, 2016

Related U.S. Application Data

(63) Continuation of application No. 14/263,661, filed on Apr. 28, 2014, now Pat. No. 9,432,974, which is a (Continued)

(30) Foreign Application Priority Data

Feb. 9, 2010 (JP) .................... 2010-026363

(51) Int. Cl.
H04W 72/04 (2009.01)
H04L 1/18 (2006.01)
H04L 5/00 (2006.01)
H04W 76/02 (2009.01)

(52) U.S. Cl.
CPC ....... *H04W 72/0413* (2013.01); *H04L 1/1812* (2013.01); *H04L 1/1861* (2013.01);
(Continued)

(58) Field of Classification Search
CPC ... H04L 1/1812; H04L 1/1861; H04L 1/1893; H04L 5/0055; H04L 5/0091;
(Continued)

(56) References Cited

U.S. PATENT DOCUMENTS

2007/0189199 A1 8/2007 Nishio
2012/0069815 A1 3/2012 Aiba et al.
2012/0263087 A1 10/2012 Aiba et al.

OTHER PUBLICATIONS

3GPP TSG RAN WG1 meeting #57, R1-091829, "PDCCH Design of Carrier Aggregation", CMCC Huawei, Agenda Item 15.4, May 4-8, 2009.

(Continued)

*Primary Examiner* — Gary Mui
(74) *Attorney, Agent, or Firm* — Birch, Stewart, Kolasch & Birch, LLP

(57) ABSTRACT

A mobile station (MS) receive a higher layer signal including first information used for indicating a first downlink component carrier (DCC). MS transmits in a first subframe, HARQ control information using a first PUCCH and a first PUCCH format in a case that a first PDSCH transmission on a second DCC different from the first DCC is indicated by a detection of a first PDCCH in a second subframe. MS transmits in a third subframe, HARQ control information using a second PUCCH and a second PUCCH format in a case that a second PDSCH transmission only on the first DCC is indicated by a detection of a second PDCCH in a fourth subframe. First PUCCH format supports a number of information bits per subframe larger than a number of information bits per subframe supported by the second (Continued)

PUCCH format. First PUCCH format is used for transmitting HARQ control information with a scheduling request.

12 Claims, 11 Drawing Sheets

Related U.S. Application Data continuation of application No. 13/577,671, filed as application No. PCT/JP2011/050983 on Jan. 20, 2011, now Pat. No. 8,750,234.

(52) U.S. Cl.
CPC .......... *H04L 1/1893* (2013.01); *H04L 5/0055* (2013.01); *H04L 5/0091* (2013.01); *H04W 72/042* (2013.01); *H04W 72/0406* (2013.01); *H04W 76/02* (2013.01)

(58) Field of Classification Search
CPC ......... H04W 72/0406; H04W 72/0413; H04W 72/042; H04W 76/02
See application file for complete search history.

(56) References Cited

OTHER PUBLICATIONS

3GPP TSG RAN WG1 Meeting #58, R1-093537, "Benefits of Carrier Indicator on Multi-Channel ACK/NACK Transmission", CATT, Potevio, Agenda item 15.4, Aug. 24-28, 2009.
3GPP TSG RAN WG1#55bis, R1-090127, "PDCCH design for carrier aggregation", Huawei, Agenda Item 12.2, Jan. 12-16, 2009.
LG Electronics, "UL Control Channel Design to Support Carrier Aggregation", 3GPP TSG RAN WG1 #56bis, Seoul, Korea, 23-27 Mar., 2009, R1-091204, 6 pages.
Samsung, "UL HARQ-ACK Signal Transmission in Rel. 10", 3GPP TSG RAN WG1 #59bis, R1-100097, Valencia, Spain, Jan. 19-23, 2010, 4 pages.
TSG-RAN WG1 #53bis, R1-082468, "Carrier aggregation in LTE-Advanced", Ericsson, Agenda Item 12, Jun. 30, 2008-Jul. 4, 2008.
U.S. Notice of Allowance issued in U.S. Appl. No. 13/577,671 dated Jan. 27, 2014.
U.S. Notice of Allowance issued in U.S. Appl. No. 14/263,661 dated Apr. 27, 2016.
U.S. Office Action for co-pending U.S. Appl. No. 14/263,661 dated Jan. 6, 2016.

COMMUNICATION METHOD, MOBILE STATION APPARATUS, BASE STATION APPARATUS AND MOBILE COMMUNICATION SYSTEM

This application is continuation of application Ser. No. 14/263,661, filed on Apr. 28, 2014, which is a continuation of application Ser. No. 13/577,671, filed on Sep. 21, 2012, which is the national phase of PCT International Application No. PCT/JP2011/050983 filed Jan. 20, 2011, which claims benefit of priority JP 2010-026363 filed Feb. 9, 2010. The entire contents of each of the above-identified applications are hereby incorporated by reference.

TECHNICAL FIELD

The present invention relates to a mobile communication system including a base station apparatus and a mobile station apparatus and to a communication method.

BACKGROUND ART

The 3rd generation partnership project (3GPP) is a project that discusses and prepares specifications of a mobile communication system based on a network evolved from Wideband-Code Division Multiple Access (W-CDMA) and Global System for Mobile Communications (GSM). In the 3GPP, the W-CDMA system is standardized as a third generation cellular mobile communication system, and services are sequentially launched. Moreover, High-speed Downlink Packet Access (HSDPA) having a higher communication speed is also standardized, and its service is launched. In the 3GPP, a study is in progress on the evolution of a third generation radio access technology (hereinafter referred to as "Long Term Evolution (LTE)" or "Evolved Universal Terrestrial Radio Access (EUTRA)") and on a mobile communication system realizing a higher-speed data transmission and reception by use of a wider frequency band (hereinafter referred to as "Long Term Evolution-Advanced (LTE-A)" or "Advanced-EUTRA").

As the communication system in the LTE, an examination is being performed on an Orthogonal Frequency Division Multiple Access (OFDMA) method in which subcarriers orthogonal to each other are used to perform user multiplexing and an Single Carrier-Frequency Division Multiple Access (SC-FDMA) method. That is, in a downlink, the OFDMA method, which is a multicarrier communication method, is proposed, and in an uplink, the SC-FDMA method, which is a single carrier communication method, is proposed.

On the other hand, as the communication system in the LTE-A, an examination is being performed, in a downlink, on the OFDMA method and, in an uplink, on the introduction of a Clustered-Single Carrier-Frequency Division Multiple Access (clustered-SC-FDMA, also referred to as a DFT-s-OFDM with spectrum division control or a DFT-precoded OFDM) in addition to the SC-FDMA method. Here, the SC-FDMA method and the clustered-SC-FDMA method, which are proposed as the uplink communication method in the LTE and the LTE-A, are characterized in that, due to the characteristic of a single carrier communication method (due to a single carrier characteristic), it is possible to suppress low a Peak to Average Power Ratio (PAPR: a transmit power) when data (information) is transmitted.

Although a frequency band used in a general mobile communication system is contiguous, in the LTE-A, it is considered to compositely use a plurality of contiguous and/or non-contiguous frequency bands (hereinafter referred to as a "Component Carrier (CC)" or a "Carrier Component (CC)"), to operate the frequency bands as one frequency band (a wide frequency band) (Frequency band aggregation: also referred to as Carrier aggregation, Spectrum aggregation, Frequency aggregation or the like). Furthermore, it is also proposed that, in order for a base station apparatus and a mobile station apparatus to use a wide frequency band more flexibly to communicate with each other, a frequency band used in a downlink communication is made to differ in frequency bandwidth from a frequency band used in an uplink communication (Asymmetric frequency band aggregation: Asymmetric carrier aggregation) (non-patent document 1).

FIG. 9 is a diagram illustrating a carrier-aggregated mobile communication system in a conventional technology. That, as shown in FIG. 9, a frequency band used in a downlink (DL) communication and a frequency used in an uplink (UL) communication have the same bandwidth is also referred to as Symmetric frequency band aggregation. As shown in FIG. 9, a base station apparatus and a mobile station apparatus compositely use a plurality of component carriers that are contiguous and/or non-contiguous frequency bands, and thus they can communicate with each other in a wide frequency band composed of a plurality of component carriers. FIG. 9 shows as an example that a frequency band (also referred to as a DL system band or a DL system bandwidth) used in a downlink communication having a bandwidth of 100 MHz is composed of five downlink component carriers (DCC1: Downlink Component Carrier 1, DCC2, DCC3, DCC4 and DCC5) each having a bandwidth of 20 MHz. FIG. 9 also shows as an example that a frequency band (also referred to as a UL system band or a UL system bandwidth) used in an uplink communication having a bandwidth of 100 MHz is composed of five uplink component carriers (UCC1: Uplink Component Carrier 1, DCC2, DCC3, DCC4 and DCC5) each having a bandwidth of 20 MHz.

As shown in FIG. 9, on each of the downlink component carriers, downlink channels such as a Physical Downlink Control Channel (PDCCH) and a Physical Downlink Shared Channel (PDSCH) are mapped. The base station apparatus allocates, to the mobile station apparatus using the PDCCH, control information (such as resource allocation information, Modulation and Coding Scheme (MCS) information, Hybrid Automatic Repeat Request (HARQ) processing information for transmitting a downlink transport block that is transmitted using the PDSCH, and transmits, using the PDSCH, the downlink transport block to the mobile station apparatus. In other words, in FIG. 9, the base station apparatus can transmit up to five downlink transport blocks to the mobile station apparatus in the same sub-frame.

On each of the uplink component carriers, uplink channels such as a Physical Uplink Control Channel (PUCCH) and a Physical Uplink Shared Channel (PUSCH) are mapped. The mobile station apparatus uses the PUCCH and/or the PUSCH to transmit, to the base station apparatus, Uplink Control Information (UCI) such as control information of the HARQ (hereinafter described as HARQ control information), channel state information and a scheduling request. Here, the HARQ control information includes information that indicates Positive Acknowledgment/Negative Acknowledgment (ACK/NACK, ACK or NACK) for the PDCCH and/or the downlink transport block and/or information that indicates Discontinuous Transmission (DTX). The information indicating the DTX is information which indicates that the mobile station apparatus has failed to detect the PDCCH transmitted from the base station apparatus.

Here, in FIG. 9, downlink/uplink component carriers where any one of the downlink/uplink channels such as the PDCCH, the PDSCH, the PUCCH and the PUSCH is not mapped may be present.

Likewise, FIG. 10 is a diagram illustrating an asymmetrically carrier-aggregated mobile communication system in the conventional technology. As shown in FIG. 10, in a base station apparatus and a mobile station apparatus, a frequency band used in a downlink communication differs in bandwidth from a frequency band used in an uplink communication, and the base station apparatus and the mobile station apparatus compositely use component carriers that are contiguous and/or non-contiguous frequency bands constituting these frequency bands and can communicate with each other in a wide frequency band. FIG. 10 shows as an example that a frequency band used in a downlink communication having a bandwidth of 100 MHz is composed of five downlink component carriers (DCC1, DCC2, DCC3, DCC4 and DCC5) each having a bandwidth of 20 MHz. FIG. 10 also shows that a frequency band used in an uplink communication having a bandwidth of 40 MHz is composed of two uplink component carriers (UCC1 and DCC2) each having a bandwidth of 20 MHz.

In FIG. 10, on each of the downlink/uplink component carriers, a downlink/uplink channel is mapped, and the base station apparatus uses the PDCCH to allocate the PDSCH to the mobile station apparatus, and uses the PDSCH to transmit the downlink transport block to the mobile station apparatus. In other words, in FIG. 10, the base station apparatus can transmit up to five downlink transport blocks to the mobile station apparatus in the same sub-frame. Moreover, the mobile station apparatus uses the PUCCH and/or the PUSCH to transmit, to the base station apparatus, uplink control information such as the HARQ control information, the channel state information and the scheduling request.

In the LTE-A, an allocation method is proposed in which the base station apparatus uses the PDCCH on the downlink component carrier to allocate the PDSCH to the mobile station apparatus (non-patent document 2).

FIG. 11 is a diagram illustrating an example of the method of using the PDCCH to allocate the PDSCH in the conventional technology. FIG. 11 shows part (part of DCC1, DCC2 and DCC3) of the downlink component carrier in FIGS. 9 and 10. As shown in FIG. 11, the base station apparatus uses a plurality of PDCCHs on one downlink component carrier, and thereby can allocate a plurality of PDSCHs to the mobile station apparatus in the same sub-frame.

FIG. 11 shows as an example that the base station apparatus uses three PDCCHs (PDCCHs respectively indicated by oblique lines, grid lines and mesh lines) on DCC2, to allocate PDSCHs on DCC1, DCC2 and DCC3 (the PDSCH on DCC1 is allocated by the PDCCH indicated by the oblique lines, the PDSCH on DCC2 is allocated by the PDCCH indicated by the grid lines and the PDSCH on DCC3 is allocated by the PDCCH indicated by the mesh lines). The base station apparatus uses the PDSCHs on DCC1, DCC2 and DCC3, and thereby can transmit up to three downlink transport blocks to the mobile station apparatus in the same sub-frame.

Non-patent document 1: "Carrier aggregation in LTE-Advanced", 3GPP TSG RAN WG1 Meeting #53bis, R1-082468, Jun. 30-Jul. 4, 2008.

Non-patent document 2: "PDCCH Design of Carrier Aggregation", 3GPP TSG RAN WG1 Meeting #57, R1-091829, May 4-8, 2009.

DISCLOSURE OF THE INVENTION

However, in the conventional technology, when the base station apparatus and the mobile station apparatus transmit and receive the HARQ control information, they disadvantageously use radio resources inefficiently.

The present invention is made in view of the foregoing conditions and has an object to provide a communication method, a mobile station apparatus, a base station apparatus and a mobile communication system in which, in case that the base station apparatus and the mobile station apparatus compositely use component carriers to communicate with each other in a wide frequency band, they can use radio resources efficiently to transmit and receive the HARQ control information.

(1) To achieve the above object, the present invention takes the following measures. That is, the communication method of the present invention is a communication method of a mobile station apparatus that uses a plurality of component carriers to communicate with a base station apparatus, and includes the steps of: attempting to decode a physical downlink control channel transmitted by the base station apparatus on a first downlink component carrier; transmitting control information of a HARQ to the base station apparatus using a first physical uplink control channel resource, in case that one physical downlink control channel corresponding to transmission of one physical downlink shared channel on a second downlink component carrier other than the first downlink component carrier is detected; and transmitting the control information of the HARQ to the base station apparatus using a second physical uplink control channel resource, in case that one physical downlink control channel corresponding to transmission of one physical downlink shared channel on the first downlink component carrier is detected.

(2) In the communication method of the present invention, in case that a plurality of physical downlink control channels corresponding to transmission of a plurality of physical downlink shared channels is detected, the control information of the HARQ is transmitted to the base station apparatus using the first physical uplink control channel resource.

(3) The communication method of the present invention is a communication method of a mobile station apparatus that uses a plurality of component carriers to communicate with a base station apparatus, comprising the steps of: attempting to decode a physical downlink control channel transmitted by the base station apparatus on a first downlink component carrier; transmitting control information of a HARQ to the base station apparatus using a first transmission format, in case that one physical downlink control channel corresponding to transmission of one physical downlink shared channel on a second downlink component carrier other than the first downlink component carrier is detected; and transmitting the control information of the HARQ to the base station apparatus using a second transmission format, in case that one physical downlink control channel corresponding to transmission of one physical downlink shared channel on the first downlink component carrier is detected.

(4) In the communication method of the present invention, in case that a plurality of physical downlink control channels corresponding to transmission of a plurality of physical downlink shared channels is detected, the control information of the HARQ is transmitted to the base station apparatus using the first transmission format.

(5) In the communication method of the present invention, the first downlink component carrier is indicated by the base station apparatus using a RRC signal.

(6) In the communication method of the present invention, the first downlink component carrier is a downlink component carrier corresponding to an uplink component carrier on which the mobile station apparatus transmits the control information of the HARQ using a physical uplink control channel.

(7) In the communication method of the present invention, the first downlink component carrier is a downlink component carrier on which the mobile station apparatus performs initial connection establishment to the base station apparatus.

(8) In the communication method of the present invention, the control information of the HARQ includes information indicating ACK/NACK for a downlink transport block.

(9) In the communication method of the present invention, the control information of the HARQ includes information indicating Discontinuous Transmission (DTX).

(10) In the communication method of the present invention, a physical resource block used as the first physical uplink control channel resource is specified by the base station apparatus.

(11) In the communication method of the present invention, a resource used as the first physical uplink control channel resource is identified by an orthogonal sequence specified by the base station apparatus.

(12) In the communication method of the present invention, a physical resource block used as the second physical uplink control channel resource is specified by the base station apparatus.

(13) In the communication method of the present invention, a resource used as the second physical uplink control channel resource is identified by an orthogonal sequence and a cyclic shift specified by the base station apparatus.

(14) In the communication method of the present invention, the number of information bits that can be transmitted using the first transmission format in each sub-frame is more than the number of information bits that can be transmitted using the second transmission format in each sub-frame.

(15) In the communication method of the present invention, in the first transmission format, a modulation scheme having a higher modulation level than a modulation scheme used in the second transmission format can be used.

(16) In the communication method of the present invention, a physical resource block used for the first transmission format is specified by the base station apparatus.

(17) In the communication method of the present invention, a resource used for the first transmission format is identified by an orthogonal sequence specified by the base station apparatus.

(18) In the communication method of the present invention, a physical resource block used for the second transmission format is specified by the base station apparatus.

(19) In the communication method of the present invention, a resource used for the second transmission format is identified by an orthogonal sequence and a cyclic shift specified by the base station apparatus.

(20) In the communication method of the present invention, the first transmission format is a transmission format capable of simultaneously transmitting the control information of the HARQ and channel state information.

(21) In the communication method of the present invention, the first transmission format is a transmission format capable of simultaneously transmitting the control information of the HARQ and a scheduling request.

(22) The communication method of the present invention is a communication method of a base station apparatus that uses a plurality of component carriers to communicate with a mobile station apparatus, and includes the steps of: transmitting, on a first downlink component carrier, a physical downlink control channel to the mobile station apparatus; receiving control information of a HARQ from the mobile station apparatus using a first physical uplink control channel resource, in case that the mobile station apparatus detects one physical downlink control channel corresponding to transmission of one physical downlink shared channel on a second downlink component carrier other than the first downlink component carrier; and receiving the control information of the HARQ from the mobile station apparatus using a second physical uplink control channel resource, in case that the mobile station apparatus detects one physical downlink control channel corresponding to transmission of one physical downlink shared channel on the first downlink component carrier.

(23) In the communication method of the present invention, in case that the mobile station apparatus detects a plurality of physical downlink control channels corresponding to transmission of a plurality of physical downlink shared channels, the control information of the HARQ is received from the mobile station apparatus using the first physical uplink control channel resource.

(24) The communication method of the present invention is a communication method of a base station apparatus that uses a plurality of component carriers to communicate with a mobile station apparatus, comprising the steps of: transmitting, on a first downlink component carrier, a physical downlink control channel to the mobile station apparatus; receiving control information of a HARQ from the mobile station apparatus using a first transmission format, in case that the mobile station apparatus detects one physical downlink control channel corresponding to transmission of one physical downlink shared channel on a second downlink component carrier other than the first downlink component carrier; and receiving the control information of the HARQ from the mobile station apparatus using a second transmission format, in case that the mobile station apparatus detects one physical downlink control channel corresponding to transmission of one physical downlink shared channel on the first downlink component carrier.

(25) In the communication method of the present invention, in case that the mobile station apparatus detects a plurality of physical downlink control channels corresponding to transmission of a plurality of physical downlink shared channels, the control information of the HARQ is received from the mobile station apparatus using the first transmission format.

(26) In the communication method of the present invention, the first downlink component carrier is indicated to the mobile station apparatus, using a RRC signal.

(27) In the communication method of the present invention, the first downlink component carrier is a downlink component carrier corresponding to an uplink component carrier on which the mobile station apparatus transmits the control information of the HARQ using a physical uplink control channel.

(28) In the communication method of the present invention, the first downlink component carrier is a downlink component carrier on which the mobile station apparatus performs initial connection establishment to the base station apparatus.

(29) In the communication method of the present invention, the control information of the HARQ includes information indicating ACK/NACK for a downlink transport block.

(30) In the communication method of the present invention, the control information of the HARQ includes information indicating Discontinuous Transmission (DTX).

(31) In the communication method of the present invention, a physical resource block used as the first physical uplink control channel resource is specified to the mobile station apparatus.

(32) In the communication method of the present invention, a resource used as the first physical uplink control channel resource is identified by an orthogonal sequence specified to the mobile station apparatus.

(33) In the communication method of the present invention, a physical resource block used as the second physical uplink control channel resource is specified to the mobile station apparatus.

(34) In the communication method of the present invention, a resource used as the second physical uplink control channel resource is identified by an orthogonal sequence and a cyclic shift specified to the mobile station apparatus.

(35) In the communication method of the present invention, the number of information bits that can be transmitted using the first transmission format in each sub-frame is more than the number of information bits that can be transmitted using the second transmission format in each sub-frame.

(36) In the communication method of the present invention, in the first transmission format, a modulation scheme having a higher modulation level than a modulation scheme used in the second transmission format can be used.

(37) In the communication method of the present invention, a physical resource block used for the first transmission format is specified to the mobile station apparatus.

(38) In the communication method of the present invention, a resource used for the first transmission format is identified by an orthogonal sequence specified to the mobile station apparatus.

(39) In the communication method of the present invention, a physical resource block used for the second transmission format is specified to the mobile station apparatus.

(40) In the communication method of the present invention, a resource used for the second transmission format is identified by an orthogonal sequence and a cyclic shift specified to the mobile station apparatus.

(41) In the communication method of the present invention, the first transmission format is a transmission format with which the mobile station apparatus can simultaneously transmit the control information of the HARQ and channel state information.

(42) In the communication method of the present invention, the first transmission format is a transmission format with which the mobile station apparatus can simultaneously transmit the control information of the HARQ and a scheduling request.

(43) The mobile station apparatus of the present invention is a mobile station apparatus that uses a plurality of component carriers to communicate with a base station apparatus, wherein the mobile station apparatus: attempts to decode a physical downlink control channel transmitted by the base station apparatus on a first downlink component carrier; transmits control information of a HARQ to the base station apparatus using a first physical uplink control channel resource, in case that one physical downlink control channel corresponding to transmission of one physical downlink shared channel on a second downlink component carrier other than the first downlink component carrier is detected; and transmits the control information of the HARQ to the base station apparatus using a second physical uplink control channel resource, in case that one physical downlink control channel corresponding to transmission of one physical downlink shared channel on the first downlink component carrier is detected.

(44) The mobile station apparatus of the present invention is a mobile station apparatus that uses a plurality of component carriers to communicate with a base station apparatus, wherein the mobile station apparatus: attempts to decode a physical downlink control channel transmitted by the base station apparatus on a first downlink component carrier; transmits control information of a HARQ to the base station apparatus using a first transmission format, in case that one physical downlink control channel corresponding to transmission of one physical downlink shared channel on a second downlink component carrier other than the first downlink component carrier is detected; and transmits the control information of the HARQ to the base station apparatus using a second transmission format, in case that one physical downlink control channel corresponding to transmission of one physical downlink shared channel on the first downlink component carrier is detected.

(45) The base station apparatus of the present invention is a base station apparatus that uses a plurality of component carriers to communicate with a mobile station apparatus, wherein the base station apparatus: transmits, on a first downlink component carrier, a physical downlink control channel to the mobile station apparatus; receives control information of a HARQ from the mobile station apparatus using a first physical uplink control channel resource, in case that the mobile station apparatus detects one physical downlink control channel corresponding to transmission of one physical downlink shared channel on a second downlink component carrier other than the first downlink component carrier; and receives the control information of the HARQ from the mobile station apparatus using a second physical uplink control channel resource, in case that the mobile station apparatus detects one physical downlink control channel corresponding to transmission of one physical downlink shared channel on the first downlink component carrier.

(46) The base station apparatus of the present invention is a base station apparatus that uses a plurality of component carriers to communicate with a mobile station apparatus, wherein the base station apparatus: transmits, on a first downlink component carrier, a physical downlink control channel to the mobile station apparatus; receives control information of a HARQ from the mobile station apparatus using a first transmission format, in case that the mobile station apparatus detects one physical downlink control channel corresponding to transmission of one physical downlink shared channel on a second downlink component carrier other than the first downlink component carrier; and receives the control information of the HARQ from the mobile station apparatus using a second transmission format, in case that the mobile station apparatus detects one physical downlink control channel corresponding to transmission of one physical downlink shared channel on the first downlink component carrier.

(47) The mobile communication system of the present invention is a mobile communication system in which a base station apparatus and a mobile station apparatus use a plurality of component carriers to communicate with each other, wherein the base station apparatus transmits, on a first downlink component carrier, a physical downlink control channel to the mobile station apparatus, and wherein the mobile station apparatus transmits control information of a HARQ to the base station apparatus using a first physical uplink control channel resource, in case that one physical downlink control channel corresponding to transmission of one physical downlink shared channel on a second downlink component carrier other than the first downlink component carrier is detected, and transmits the control information of the HARQ to the base station apparatus using a second physical uplink control channel resource, in case that one physical downlink control channel corresponding to transmission of one physical downlink shared channel on the first downlink component carrier is detected.

(48) The mobile communication system of the present invention is a mobile communication system in which a base station apparatus and a mobile station apparatus use a plurality of component carriers to communicate with each other, wherein the base station apparatus transmits, on a first downlink component carrier, a physical downlink control channel to the mobile station apparatus, and wherein the mobile station apparatus transmits control information of a HARQ to the base station apparatus using a first transmission format, in case that one physical downlink control channel corresponding to transmission of one physical downlink shared channel on a second downlink component carrier other than the first downlink component carrier is detected, and transmits the control information of the HARQ to the base station apparatus using a second transmission format, in case that one physical downlink control channel corresponding to transmission of one physical downlink shared channel on the first downlink component carrier is detected.

According to the present invention, in case that the base station apparatus and the mobile station apparatus compositely use component carriers to communicate with each other in a wide frequency band, they can use radio resources efficiently to transmit and receive the HARQ control information.

BEST MODES FOR CARRYING OUT THE INVENTION

Figure 1:
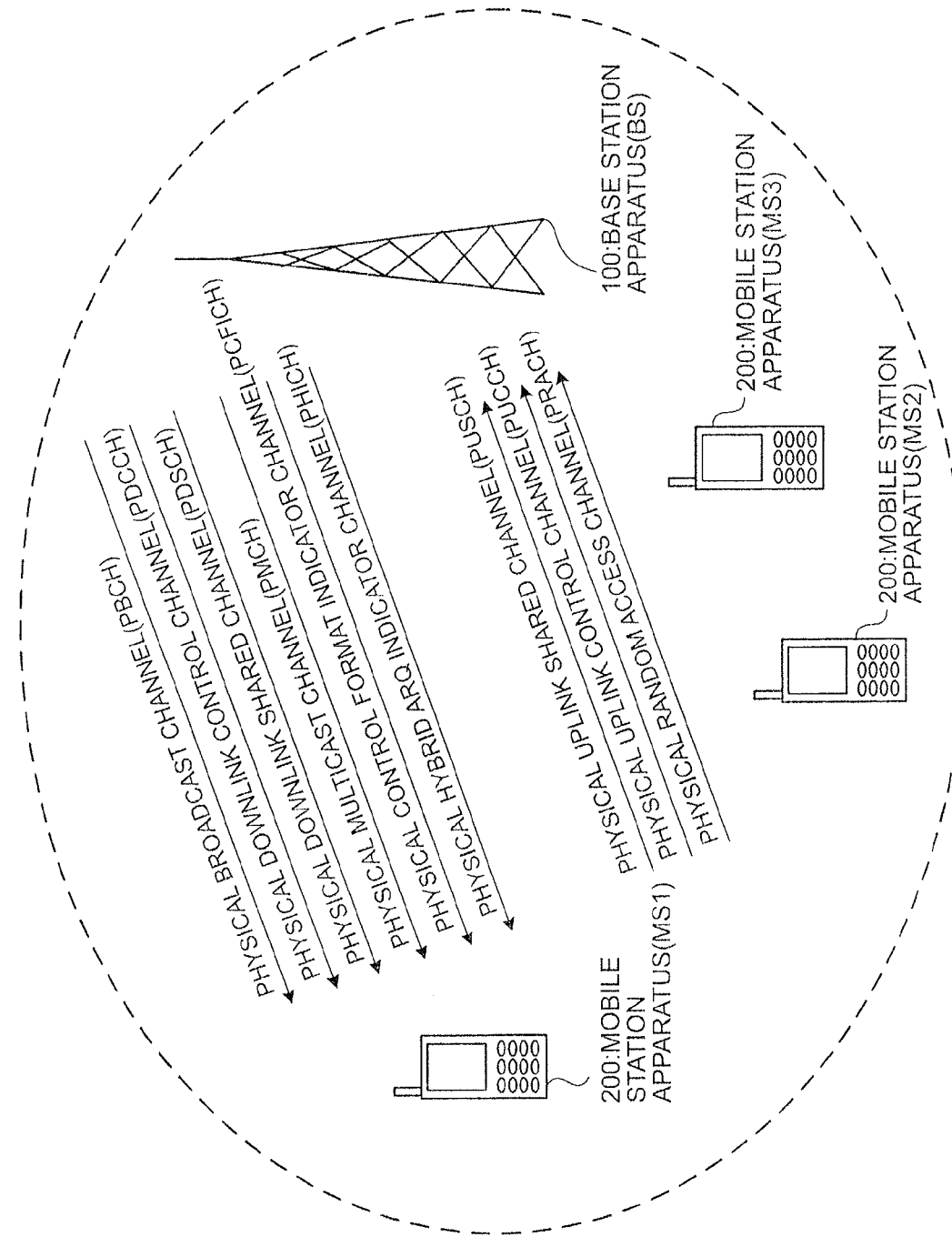
FIG. 1 is a diagram conceptually showing the configuration of a physical channel according to an embodiment of the present invention.

Embodiments of the present invention will now be described with reference to accompanying drawings. FIG. 1 is a diagram showing an example of the configuration of channels according to an embodiment of the present invention. A downlink physical channel is composed of a Physical Broadcast Channel (PBCH), a Physical Downlink Control Channel (PDCCH), a Physical Downlink Shared Channel (PDSCH), a Physical Multicast Channel (PMCH), a Physical Control Format Indicator Channel (PCFICH) and a Physical Hybrid ARQ Indicator Channel (PHICH). An uplink physical channel is composed of a Physical Uplink Shared Channel (PUSCH), a Physical Uplink Control Channel (PUCCH) and a Physical Random Access Channel (PRACH).

The PBCH maps the Broadcast Channel (BCH) at intervals of 40 milliseconds. The timing of 40 milliseconds is detected by blind detection. In other words, explicit signaling is not performed to present timing. With respect to a sub-frame including the PBCH, decoding can be performed with only the sub-frame (self-decodable).

The PDCCH is a channel that is used to provide, to the mobile station apparatus, notification (specification) of the resource allocation of the PDSCH, HARQ processing information on downlink data, the resource allocation of the PUSCH and the like. The PDCCH is composed of a plurality of Control Channel Elements (CCEs); the mobile station apparatus detects the PDCCH composed of the CCEs and thereby receives the PDCCH from the base station apparatus. The CCE includes a plurality of Resource Element Groups (REGs, also referred to as mini-CCEs) spread in a frequency domain and a time domain. Here, the resource element is a unit resource that is composed of one OFDM symbol (time component) and one sub-carrier (frequency component); for example, the REG is composed of four downlink resource elements contiguous in a frequency domain within the same OFDM symbol except a downlink pilot channel. For example, one PDCCH is composed of one, two, four or eight CCEs in which numbers (CCE indices) for identifying the CCEs are continuous.

Here, the PDCCHs are separately coded on an individual mobile station apparatus basis for each type (separate coding). That is, the mobile station apparatus detects a plurality of PDCCHs, and acquires resource allocation in a downlink or an uplink and other control information. A value of Circulation Redundancy Check (CRC) is given to each of the PDCCHs; the mobile station apparatus performs the CRC on each of the sets of CCEs that are likely to constitute the PDCCH, and thereby can acquire the PDCCH in which the CRC has been successfully performed. This is also referred to as blind decoding; a range of the sets of CCEs that are likely to constitute the PDCCH and that are subjected to the blind decoding is referred to as a search space. In other words, the mobile station apparatus performs the blind decoding on the CCEs within the search space and detects the PDCCH.

In case that the resource allocation of the PDSCH is transmitted on the PDCCH, the mobile station apparatus responds to the resource allocation indicated by the PDCCH from the base station apparatus, and uses the PDSCH to receive data (hereinafter also referred to as a downlink signal) (downlink data (Downlink Shared Channel (DL-SCH) and/or downlink control data (downlink control information)). In other words, this PDCCH is a signal (hereinafter also referred to as a "downlink transmission permission signal" or a "downlink grant") for performing the resource allocation for the downlink. In case that the resource allocation of the PUSCH is transmitted on the PDCCH, the mobile station apparatus responds to the resource allocation indicated by the PDCCH from the base station apparatus, and uses the PUSCH to transmit data (hereinafter also referred to as an uplink signal) (uplink data (Uplink Shared Channel (UL-SCH) and/or uplink control data (uplink control information)). In other words, this PDCCH is a signal (hereinafter also referred to as an "uplink transmission permission signal" or an "uplink grant") for permitting the data transmission for the uplink.

The PDSCH is a channel that is used for transmitting downlink data (Downlink Shared Channel: DL-SCH) or paging information (Paging Channel: PCH). The PMCH is a channel that is utilized for transmitting a Multicast Channel (MCH); a downlink reference signal, an uplink reference signal and a physical downlink synchronization signal are additionally mapped.

Here, the downlink data (DL-SCH) indicates, for example, the transmission of user data, and the DL-SCH is a transport channel. In the DL-SCH, the HARQ and dynamic adaptive radio link control are supported, and beam forming is available. In the DL-SCH, dynamic resource allocation and quasi-static resource allocation are supported.

The PUSCH is a channel that is mainly used for transmitting the uplink data (Uplink Shared Channel: UL-SCH). When the base station apparatus performs scheduling on the mobile station apparatus, the uplink control information is also transmitted using the PUSCH. The uplink control information composed of the Channel State Information (CSI) (or Channel Statistical Information) that indicates the channel state of the downlink, a downlink channel quality indicator (CQI), a precoding matrix indicator (PMI), a rank indicator (RI) and the HARQ control information. Here, the HARQ control information includes information that indicates ACK/NACK for the PDCCH and/or the downlink transport block transmitted from the base station apparatus and/or information that indicates the DTX. The information indicating the DTX refers to information which indicates that the mobile station apparatus has failed to detect the PDCCH transmitted from the base station apparatus.

Here, the uplink data (UL-SCH) indicates, for example, the transmission of user data, and the UL-SCH is a transport channel. In the UL-SCH, the HARQ and dynamic adaptive radio link control are supported, and beam forming is available. In the UL-SCH, dynamic resource allocation and quasi-static resource allocation are supported.

The uplink data (UL-SCH) and the downlink data (DL-SCH) may include a Radio Resource Control Signaling (hereinafter referred to as a "RRC signaling") exchanged between the base station apparatus and the mobile station apparatus, a Medium Access Control (MAC) control element and the like. The base station apparatus and the mobile station apparatus transmit and receive the RRC signaling in a higher layer (a radio resource control layer). The base station apparatus and the mobile station apparatus also transmit and receive the MAC control element in a higher layer (a Medium Access Control (MAC) layer).

The PUCCH is a channel that is used for transmitting the uplink control information. Here, the uplink control information includes, for example, the channel state information (CSI) indicating the downlink channel state, the downlink channel quality indicator (CQI), the precoding matrix indicator (PMI), the rank indicator (RI), the Scheduling Request (SR) in which the mobile station apparatus requests resource allocation for transmitting the uplink data (requests the transmission in the UL-SCH) and the HARQ control information.

The PCFICH is a channel that is utilized for notifying the mobile station apparatus of the number of OFDM symbols used for the PDCCH, and the PCFICH is transmitted in each sub-frame. The PHICH is a channel that is utilized for transmitting ACK/NACK of the HARQ for the uplink data (UL-SCH). The PRACH is a channel that is used for transmitting a random access preamble, and the PRACH has a guard time. As shown in FIG. 1, the mobile communication system according to the present embodiment includes the base station apparatus 100 and mobile station apparatuses 200.

[Configuration of the Base Station Apparatus 100]

Figure 2:
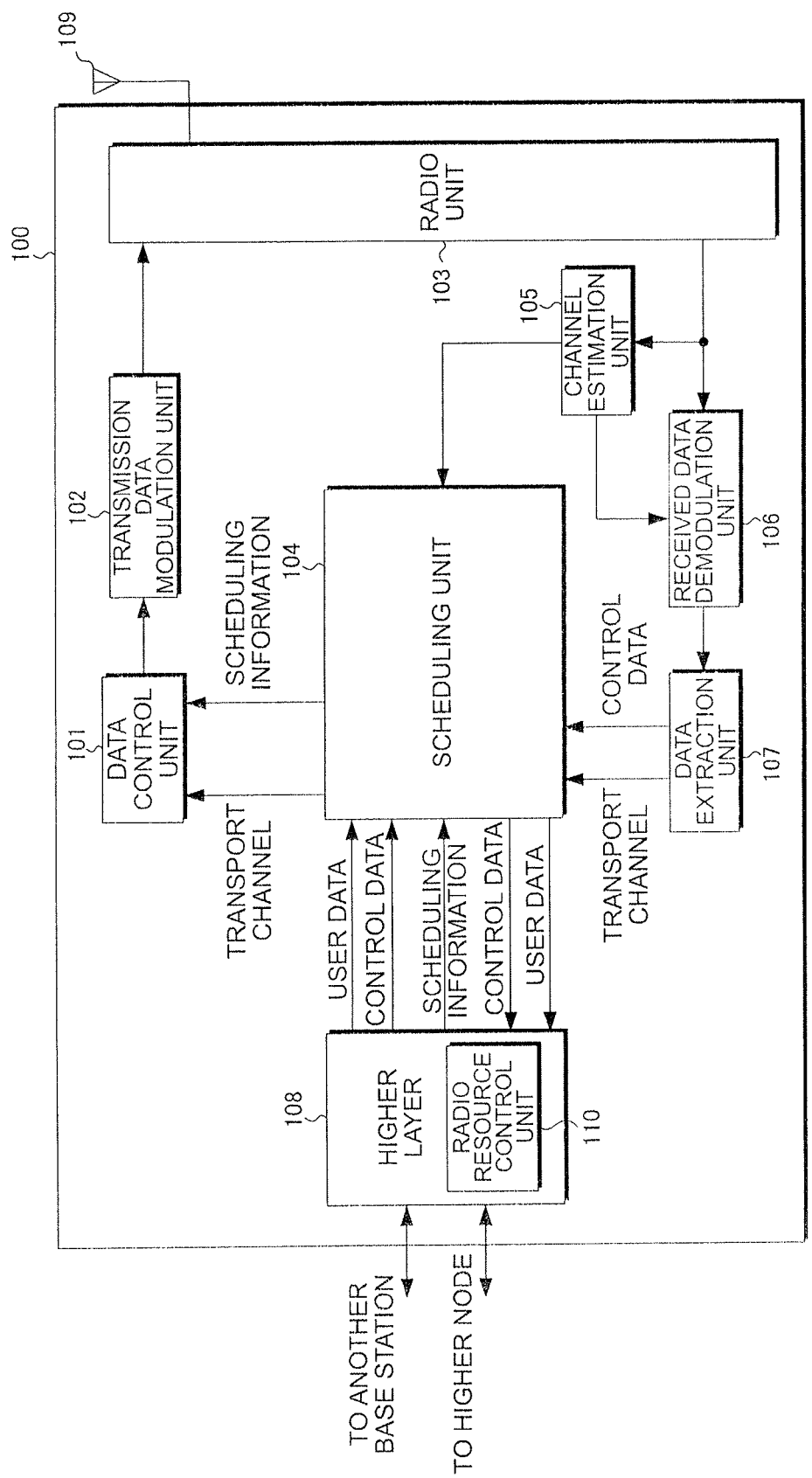
FIG. 2 is a block diagram schematically showing the configuration of a base station apparatus according to the embodiment of the present invention.

FIG. 2 is a block diagram schematically showing the configuration of the base station apparatus 100 according to the embodiment of the present invention. The base station apparatus 100 is configured to include a data control unit 101, a transmission data modulation unit 102, a radio unit 103, a scheduling unit 104, a channel estimation unit 105, a received data demodulation unit 106, a data extraction unit 107, a higher layer 108 and an antenna 109. The radio unit 103, the scheduling unit 104, the channel estimation unit 105, the received data demodulation unit 106, the data extraction unit 107, the higher layer 108 and the antenna 109 constitute a reception unit; the data control unit 101, the transmission data modulation unit 102, the radio unit 103, the scheduling unit 104, the higher layer 108 and the antenna 109 constitute a transmission unit.

The antenna 109, the radio unit 103, the channel estimation unit 105, the received data demodulation unit 106 and the data extraction unit 107 perform processing on the uplink physical layer. The antenna 109, the radio unit 103, the transmission data modulation unit 102 and the data control unit 101 perform processing on the downlink physical layer.

The data control unit 101 receives the transport channel from the scheduling unit 104. The data control unit 101 maps, on the physical channel, the transport channel and a signal and a channel generated in the physical layer based on scheduling information input from the scheduling unit 104. Each piece of data mapped as described above is output to the transmission data modulation unit 102.

The transmission data modulation unit 102 modulates the transmission data into the OFDM system. Based on the scheduling information from the scheduling unit 104 and a modulation scheme and a coding method corresponding to each PRB, the transmission data modulation unit 102 performs, on the data input from the data control unit 101, data modulation, coding, series/parallel transform on the input signal, Inverse Fast Fourier Transform (IFFT) processing, Cyclic Prefix (CP) insertion and signal processing such as filtering, generates transmission data and outputs it to the radio unit 103. Here, the scheduling information includes downlink physical resource block Physical Resource Block (PRB) allocation information, for example, physical resource block position information including a frequency and a time; the modulation scheme and the coding method corresponding to each PRB includes, for example, information such as the modulation scheme: 16 QAM and a coding rate: 2/3.

The radio unit 103 upconverts the modulation data input from the transmission data modulation unit 102 into a radio frequency to generate a radio signal, and transmits it through the antenna 109 to the mobile station apparatus 200. The radio unit 103 receives the uplink radio signal from the mobile station apparatus 200 through the antenna 109, downconverts it into a base band signal and outputs the received data to the channel estimation unit 105 and the received data demodulation unit 106.

The scheduling unit 104 performs processing on the Medium Access Control (MAC) layer. The scheduling unit 104 performs mapping on a logical channel and the transport channel, scheduling (such as HARQ processing and the selection of a transport format) for the downlink and the uplink and the like. The scheduling unit 104 has, in order to integrally control the processing units of individual physical layers, interfaces between the scheduling unit 104 and the antenna 109, the radio unit 103, the channel estimation unit 105, the received data demodulation unit 106, the data control unit 101, the transmission data modulation unit 102 and the data extraction unit 107 (not shown).

In the downlink scheduling, based on feedback information (the uplink channel state information (CSI, CQI, PMI and RI) received from the mobile station apparatus 200, the ACK/NACK information on the downlink data and the like), information on the PRB available in each of the mobile station apparatuses 200, buffer conditions, the scheduling information input from the higher layer 108 and the like, the scheduling unit 104 performs selection processing on the downlink transport format (the transmission form, that is, the allocation of the physical resource block, the modulation scheme, the coding method and the like) for modulating each piece of data, retransmission control on the HARQ and the generation of scheduling information that is used for the downlink. The scheduling information used for scheduling the downlink is output to the data control unit 101.

In the uplink scheduling, based on the result of estimation of the uplink channel state (radio propagation path state) output by the channel estimation unit 105, a resource allocation request from the mobile station apparatus 200, the information on the PRB available in each of the mobile station apparatuses 200, the scheduling information input from the higher layer 108 and the like, the scheduling unit 104 performs selection processing on the uplink transport format (the transmission form, that is, the allocation of the physical resource block, the modulation scheme, the coding method and the like) for modulating each piece of data and the generation of scheduling information that is used for the uplink scheduling. The scheduling information used for scheduling the uplink is output to the data control unit 101.

The scheduling unit 104 maps the downlink logical channel input from the higher layer 108 on the transport channel, and outputs it to the data control unit 101. The scheduling unit 104 also processes, as necessary, the control data input from the data extraction unit 107 and acquired in the uplink and the transport channel, thereafter maps them on the uplink logical channel and outputs it to the higher layer 108.

In order to demodulate the uplink data, the channel estimation unit 105 estimates the uplink channel state from an uplink Demodulation Reference Signal (DRS), and outputs the result of the estimation to the received data demodulation unit 106. Moreover, in order to perform uplink scheduling, the channel estimation unit 105 estimates the uplink channel state from an uplink Sounding Reference Signal (SRS) and outputs the result of the estimation to the scheduling unit 104.

The received data demodulation unit 106 also functions as an OFDM demodulation unit and/or a DFT-spread-OFDM (DFT-S-OFDM) demodulation unit that demodulate the received data modulated into the OFDM system and/or the SC-FDMA system, respectively. Based on the result of the estimation of the uplink channel state input from the channel estimation unit 105, the received data demodulation unit 106 performs, on the modulation data input from the radio unit 103, signal processing such as DFT transport, sub-carrier mapping, IFFT transport and filtering, and thereby performs demodulation processing, and outputs it to the data extraction unit 107.

The data extraction unit 107 checks whether the data input from the received data demodulation unit 106 is right or wrong, and outputs the result of the checking (positive acknowledgment signal ACK/negative acknowledgment signal NACK) to the scheduling unit 104. The data extraction unit 107 also separates the transport channel and the control data on the physical layer from the data input from the received data demodulation unit 106, and outputs them to the scheduling unit 104. The separated control data includes the channel state information (CSI) notified from the mobile station apparatus 200, the downlink channel quality indicator (CQI), the precoding matrix indicator (PMI), the rank indicator (RI), the HARQ control information, the scheduling request and the like.

The higher layer 108 performs processing on a Packet Data Convergence Protocol (PDCP) layer, a Radio Link Control (RLC) layer and a Radio Resource Control (RRC) layer. The higher layer 108 has, in order to integrally control the processing units of the lower layer, interfaces between the higher layer 108 and the scheduling unit 104, the antenna 109, the radio unit 103, the channel estimation unit 105, the received data demodulation unit 106, the data control unit 101, the transmission data modulation unit 102 and the data extraction unit 107 (not shown).

The higher layer 108 includes a radio resource control unit 110 (also referred to as a control unit). The radio resource control unit 110 performs management on various types of setting information, management on system information, paging control, management on the communication state of each of the mobile station apparatuses 200, mobility management such as handover and the like, management on the buffer conditions of each of the mobile station apparatuses 200, management on the connection settings of a unicast and a multicast bearer, management on a mobile station indicator (UEID) and the like. The higher layer 108 exchanges information with another base station apparatus 100 and information with an higher node.

[Configuration of the Mobile Station Apparatus 200]

Figure 3:
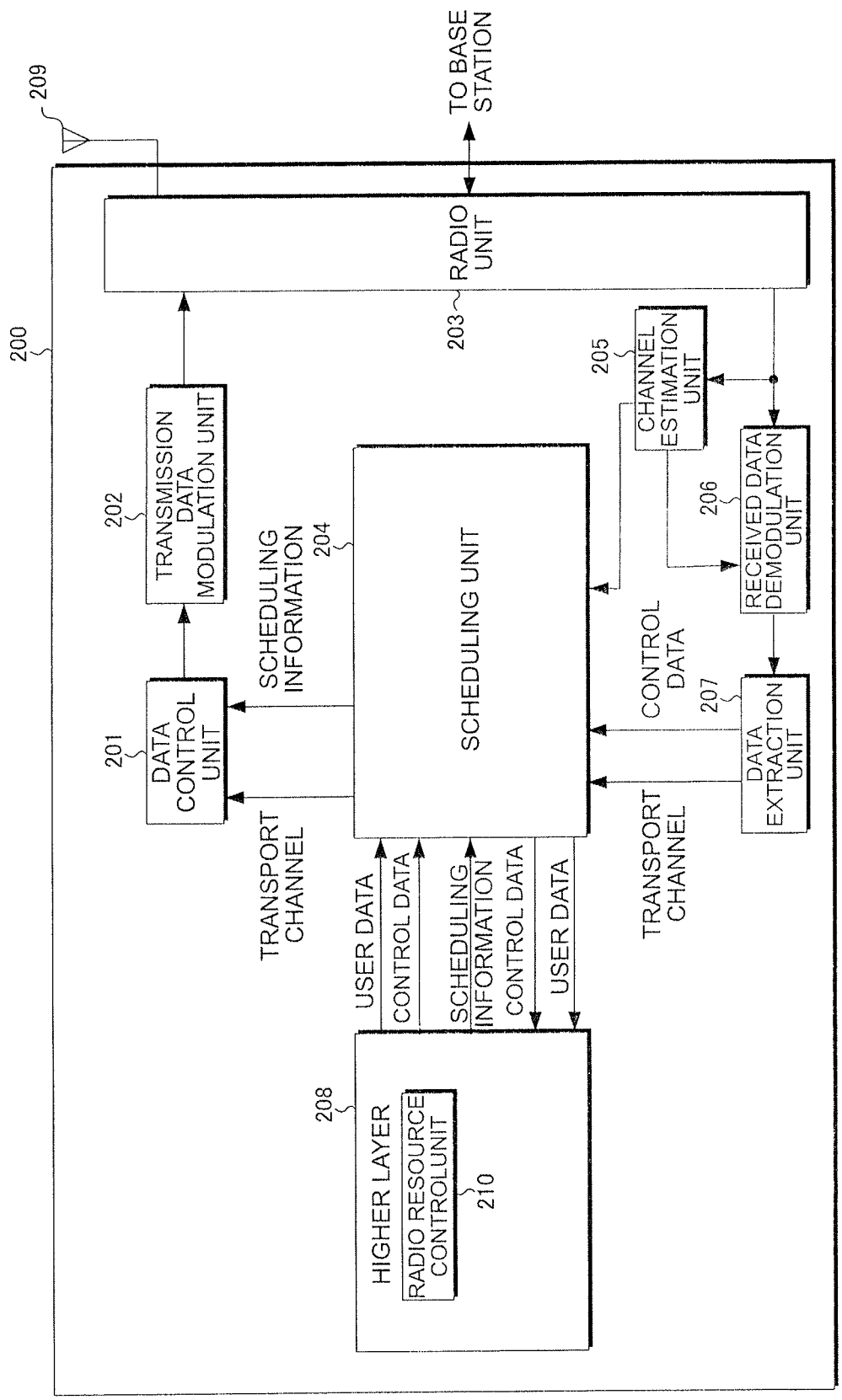
FIG. 3 is a block diagram schematically showing the configuration of a mobile station apparatus according to the embodiment of the present invention.

FIG. 3 is a block diagram schematically showing the configuration of the mobile station apparatus 200 according to the embodiment of the present invention. The mobile station apparatus 200 is configured to include a data control unit 201, a transmission data modulation unit 202, a radio unit 203, a scheduling unit 204, a channel estimation unit 205, a received data demodulation unit 206, a data extraction unit 207, a higher layer 208 and an antenna 209. The data control unit 201, the transmission data modulation unit 202, the radio unit 203, the scheduling unit 204, the higher layer 208 and the antenna 209 constitute a transmission unit; the radio unit 203, the scheduling unit 204, the channel estimation unit 205, the received data demodulation unit 206, the data extraction unit 207, the higher layer 208 and the antenna 209 constitute a reception unit.

The data control unit 201, the transmission data modulation unit 202 and the radio unit 203 perform processing on the uplink physical layer. The radio unit 203, the channel estimation unit 205, the received data demodulation unit 206 and the data extraction unit 207 perform processing on the downlink physical layer.

The data control unit 201 receives the transport channel from the scheduling unit 204. The data control unit 201 maps, on the physical channel, the transport channel and a signal and a channel generated in the physical layer based on scheduling information input from the scheduling unit 204. Each piece of data mapped in this way is output to the transmission data modulation unit 202.

The transmission data modulation unit 202 modulates the transmission data into the OFDM system and/or the SC-FDMA system. The transmission data modulation unit 202 performs, on the data input from the data control unit 201, data modulation, Discrete Fourier Transform (DFT) processing, sub-carrier mapping, Inverse Fast Fourier Transform (IFFT) processing, CP insertion and signal processing such as filtering, generates transmission data and outputs it to the radio unit 203.

The radio unit 203 upconverts the modulation data input from the transmission data modulation unit 202 into a radio frequency to generate a radio signal and transmits it through the antenna 209 to the base station apparatus 100. The radio unit 203 receives the radio signal modulated with the downlink data from the base station apparatus 100 through the antenna 209, downconverts it into a base band signal and outputs the received data to the channel estimation unit 205 and the received data demodulation unit 206.

The scheduling unit 204 performs processing on the Medium Access Control (MAC) layer. The scheduling unit 204 performs mapping on a logical channel and the transport channel, scheduling (such as HARQ processing and the selection of a transport format) for the downlink and the uplink and the like. The scheduling unit 204 has, in order to integrally control the processing units of individual physical layers, interfaces between the scheduling unit 204 and the antenna 209, the data control unit 201, the transmission data modulation unit 202, the channel estimation unit 205, the received data demodulation unit 206, the data extraction unit 207 and the radio unit 203 (not shown).

In the downlink scheduling, based on scheduling information (such as the transport format and HARQ retransmission information) from the base station apparatus 100 and the higher layer 208 and the like, the scheduling unit 204 performs reception control on the transport channel, the physical signal and the physical channel and HARQ retransmission control and the generation of the scheduling information used for the downlink scheduling. The scheduling information used for the downlink scheduling is output to the data control unit 201.

In the uplink scheduling, based on uplink buffer conditions input from the higher layer 208, uplink scheduling information (such as the transport format and HARQ retransmission information) from the base station apparatus 100 that is input from the data extraction unit 207, scheduling information input from the higher layer 208, the scheduling unit 204 performs scheduling processing for mapping the uplink logical channel input from the higher layer 208 on the transport channel and the generation of the scheduling information used for uplink scheduling. For the uplink transport format, the information notified from the base station apparatus 100 is utilized. The scheduling information described above is output to the data control unit 201.

The scheduling unit 204 maps the uplink logical channel input from the higher layer 208 on the transport channel, and outputs it to the data control unit 201. The scheduling unit 204 also outputs, to the data control unit 201, the downlink channel state information (CSI) input from the channel estimation unit 205, the downlink channel quality indicator (CQI), the precoding matrix indicator (PMI), the rank indicator (RI) and the result of checking of the CRC check input from the data extraction unit 207. The scheduling unit 204 also processes, as necessary, the control data input from the data extraction unit 207 and acquired in the downlink and the transport channel, thereafter maps them on the downlink logical channel and outputs it to the higher layer 208.

In order to demodulate the downlink data, the channel estimation unit 205 estimates the downlink channel state from a downlink Reference Signal (RS), and outputs the result of the estimation to the received data demodulation unit 206. Moreover, in order to notify the base station apparatus 100 of the result of the estimation of the downlink channel state (radio propagation path state), the channel estimation unit 205 estimates the downlink channel state from the downlink Reference Signal (RS) and outputs the result of the estimation to the scheduling unit 204 as the downlink channel state information CSI, the downlink channel quality indicator CQI, the precoding matrix indicator PMI and the rank indicator RI.

The received data demodulation unit 206 demodulates the received data modulated into the OFDM system. Based on the result of the estimation of the downlink channel state input from the channel estimation unit 205, the received data demodulation unit 206 performs demodulation processing on the modulation data input from the radio unit 203, and outputs it to the data extraction unit 207.

The data extraction unit 207 performs the CRC check on the data input from the received data demodulation unit 206 to check whether it is right or wrong, and outputs the result of the checking (positive acknowledgment ACK/negative acknowledgment NACK) to the scheduling unit 204. The data extraction unit 207 also separates the transport channel and the control data on the physical layer from the data input from the received data demodulation unit 206, and outputs them to the scheduling unit 204. The separated control data includes scheduling information such as the resource allocation in the downlink or the uplink and the uplink HARQ control information.

The higher layer 208 performs processing on a Packet Data Convergence Protocol (PDCP) layer, a Radio Link Control (RLC) layer and a Radio Resource Control (RRC) layer. The higher layer 208 has, in order to integrally control the processing units of the lower layer, interfaces between the higher layer 208 and the scheduling unit 204, the antenna 209, the data control unit 201, the transmission data modulation unit 202, the channel estimation unit 205, the received data demodulation unit 206, the data extraction unit 207 and the radio unit 203 (not shown).

The higher layer 208 includes a radio resource control unit 210 (also referred to as a control unit). The radio resource control unit 210 performs management on various types of setting information, management on system information, paging control, management on the communication state of the own station, mobility management such as handover, management on the buffer conditions, management on the connection settings of a unicast and a multicast bearer and management on a mobile station indicator (UEID).

First Embodiment

A first embodiment in the mobile communication system using the base station apparatus 100 and the mobile station apparatus 200 will now be described. In the first embodiment, the base station apparatus 100 transmits, to the mobile station apparatus 200, a first parameter specifying a first region where the mobile station apparatus 200 can utilize the PUCCH and transmits, to the mobile station apparatus 200, a second parameter specifying a second region that is different from the first region where the mobile station apparatus 200 can utilize the PUCCH; in case that the base station apparatus 100 uses a plurality of PDCCHs to allocate (schedule) a plurality of PDSCHs in the same sub-frame, the mobile station apparatus 200 uses the first region to transmit the HARQ control information to the base station apparatus 100 whereas, in case that the base station apparatus 100 uses one PDCCH to allocate (schedule) one PDSCH, the mobile station apparatus 200 uses the first region or the second region to transmit the HARQ control information to the base station apparatus 100.

The base station apparatus 100 transmits, to the mobile station apparatus 200, the first parameter specifying the first region where the mobile station apparatus 200 can utilize the PUCCH and transmits, to the mobile station apparatus 200, the second parameter specifying the second region that is different from the first region where the mobile station apparatus 200 can utilize the PUCCH; in case that the base station apparatus 100 uses one PDCCH on a component carrier other than a specific component carrier to allocate (schedule) one PDSCH, the mobile station apparatus 200 uses the first region to transmit the HARQ control information to the base station apparatus 100 whereas, in case that the base station apparatus 100 uses one PDCCH on the specific component carrier to allocate (schedule) one PDSCH, the mobile station apparatus 200 uses the second region to transmit the HARQ control information to the base station apparatus 100.

The base station apparatus 100 transmits, to the mobile station apparatus 200, the first parameter specifying the first region where the mobile station apparatus 200 can utilize the PUCCH and transmits, to the mobile station apparatus 200, the second parameter specifying the second region that is different from the first region where the mobile station apparatus 200 can utilize the PUCCH; in case that the base station apparatus 100 uses a plurality of PDCCHs to allocate (schedule) a plurality of PDSCHs in the same sub-frame or in case that the base station apparatus 100 uses one PDCCH on a component carrier other than the specific component carrier to allocate (schedule) one PDSCH, the mobile station apparatus 200 uses the first region to transmit the HARQ control information to the base station apparatus 100 whereas, in case that the base station apparatus 100 uses one PDCCH on the specific component carrier to allocate (schedule) one PDSCH, the mobile station apparatus 200 uses the second region to transmit the HARQ control information to the base station apparatus 100.

Furthermore, the base station apparatus 100 transmits, to the mobile station apparatus 200, the first parameter specifying the first region where the mobile station apparatus 200 can utilize a first transmission format, and transmits, to the mobile station apparatus 200, the second parameter specifying the second region in which the mobile station apparatus 200 can utilize a second transmission format and which is different from the first region; in case that the base station apparatus 100 uses a plurality of PDCCHs to allocate (schedule) a plurality of PDSCHs in the same sub-frame, the mobile station apparatus 200 uses the first transmission format to transmit the HARQ control information to the base station apparatus 100 whereas, in case that the base station apparatus 100 uses one PDCCH to allocate (schedule) one PDSCH, the mobile station apparatus 200 uses the first transmission format or the second transmission format to transmit the HARQ control information to the base station apparatus 100.

Moreover, the base station apparatus 100 transmits, to the mobile station apparatus 200, the first parameter specifying the first region where the mobile station apparatus 200 can utilize the first transmission format, and transmits, to the mobile station apparatus 200, the second parameter specifying the second region in which the mobile station apparatus 200 can utilize the second transmission format and which is different from the first region; in case that the base station apparatus 100 uses one PDCCH on a component carrier other than the specific component carrier to allocate (schedule) one PDSCH, the mobile station apparatus 200 uses the first transmission format to transmit the HARQ control information to the base station apparatus 100 whereas, in case that the base station apparatus 100 uses one PDCCH on the specific component carrier to allocate (schedule) one PDSCH, the mobile station apparatus 200 uses the second transmission format to transmit the HARQ control information to the base station apparatus 100.

Moreover, the base station apparatus 100 transmits, to the mobile station apparatus 200, the first parameter specifying the first region where the mobile station apparatus 200 can utilize the first transmission format, and transmits, to the mobile station apparatus 200, the second parameter specifying the second region in which the mobile station apparatus 200 can utilize the second transmission format and which is different from the first region; in case that the base station apparatus 100 uses a plurality of PDCCHs to allocate (schedule) a plurality of PDSCHs in the same sub-frame or in case that the base station apparatus 100 uses one PDCCH on a component carrier other than the specific component carrier to allocate (schedule) one PDSCH, the mobile station apparatus 200 uses the first transmission format to transmit the HARQ control information to the base station apparatus 100 whereas, in case that the base station apparatus 100 uses one PDCCH on the specific component carrier to allocate (schedule) one PDSCH, the mobile station apparatus 200 uses the second transmission format to transmit the HARQ control information to the base station apparatus 100.

Here, the HARQ control information transmitted from the mobile station apparatus 200 includes information indicating ACK/NACK and/or information indicating the DTX for the PDCCH and/or the downlink transport block transmitted from the base station apparatus 100. The information indicating the DTX is information which indicates that the mobile station apparatus 200 has failed to detect the PDCCH transmitted from the base station apparatus 100.

The first parameter transmitted from the base station apparatus 100 to the mobile station apparatus 200 includes information indicating a bandwidth (bandwidth of a PUCCH resource region) that specifies the first region where the mobile station apparatus 200 can utilize the PUCCH. The first parameter also includes information (which is information on the orthogonal resource or may be information for calculating the orthogonal resource) indicating the orthogonal resource that specifies the first region where the mobile station apparatus 200 can utilize the PUCCH. The first parameter also includes information indicating a bandwidth (bandwidth of the PUCCH resource region) where the mobile station apparatus 200 can utilize the first transmission format. The first parameter also includes information (which is information on the orthogonal resource or may be information for calculating the orthogonal resource) indicating the orthogonal resource where the mobile station apparatus 200 can utilize the first transmission format.

Furthermore, the second parameter transmitted from the base station apparatus 100 to the mobile station apparatus 200 includes information indicating a bandwidth (bandwidth of the PUCCH resource region) that specifies the second region where the mobile station apparatus 200 can utilize the PUCCH. The second parameter also includes information (which is information on the orthogonal resource or may be information for calculating the orthogonal resource) indicating the orthogonal resource that specifies the second region where the mobile station apparatus 200 can utilize the PUCCH. The second parameter also includes information indicating a bandwidth (bandwidth of the PUCCH resource region) where the mobile station apparatus 200 can utilize the second transmission format. The second parameter also includes information (which is information on the orthogonal resource or may be information for calculating the orthogonal resource) indicating the orthogonal resource where the mobile station apparatus 200 can utilize the second transmission format.

Although, in the following description of the present embodiment, the frequency band is defined by the bandwidth (Hz), it may be defined by the number of resource blocks (RBs) including frequencies and times. In other words, the bandwidth may be defined by the number of resource blocks. The bandwidth and the number of resource blocks can be also defined by the number of sub-carriers. The component carrier in the present embodiment refers to a (narrow) frequency band that is compositely used when the base station apparatus 100 and the mobile station apparatus 200 communicate with each other in a mobile communication system having a (wide) frequency band (which may be a system band). The base station apparatus 100 and the mobile station apparatus 200 aggregate a plurality of component carriers (for example, five frequency bands each having a bandwidth of 20 MHz), and thereby constitute a (wide) frequency band (for example, a frequency band having a bandwidth of 100 MHz); these component carriers are compositely used, and thus it is possible to realize a high-speed data communication (the transmission and reception of information).

The component carrier indicates each of the (narrow) frequency bands (for example, a frequency band having a bandwidth of 20 MHz) that constitute this (wide) frequency band (for example, a frequency band having a bandwidth of 100 MHz). The component carrier may indicate a (center) carrier frequency of each of the (narrow) frequency bands. Specifically, the downlink component carrier has a band (width) of the frequency band that can be used when the base station apparatus 100 and the mobile station apparatus 200 transmit and receives downlink information; the uplink component carrier has a band (width) of the frequency band that can be used when the base station apparatus 100 and the mobile station apparatus 200 transmit and receives uplink information. Furthermore, the component carrier may be defined as a unit in which a specific physical channel (for example, the PDCCH or the PUCCH) is configured.

The component carriers may be mapped either in contiguous frequency bands or in non-contiguous frequency bands; the base station apparatus 100 and the mobile station apparatus 200 aggregate a plurality of component carriers that are contiguous and/or non-contiguous frequency bands, to constitute a wide frequency band; these component carriers are compositely used, and thus it is possible to realize a high-speed data communication (the transmission and reception of information).

Furthermore, a frequency band that is composed of the component carriers and that is used in the downlink communication and a frequency band that is used in the uplink communication do not need to have the same bandwidth; the base station apparatus 100 and the mobile station apparatus 200 compositely use a downlink frequency band that is composed of the component carriers and that has a different bandwidth and an uplink frequency band, and thereby can communicate with each other (the asymmetric carrier aggregation described above).

Figure 4:
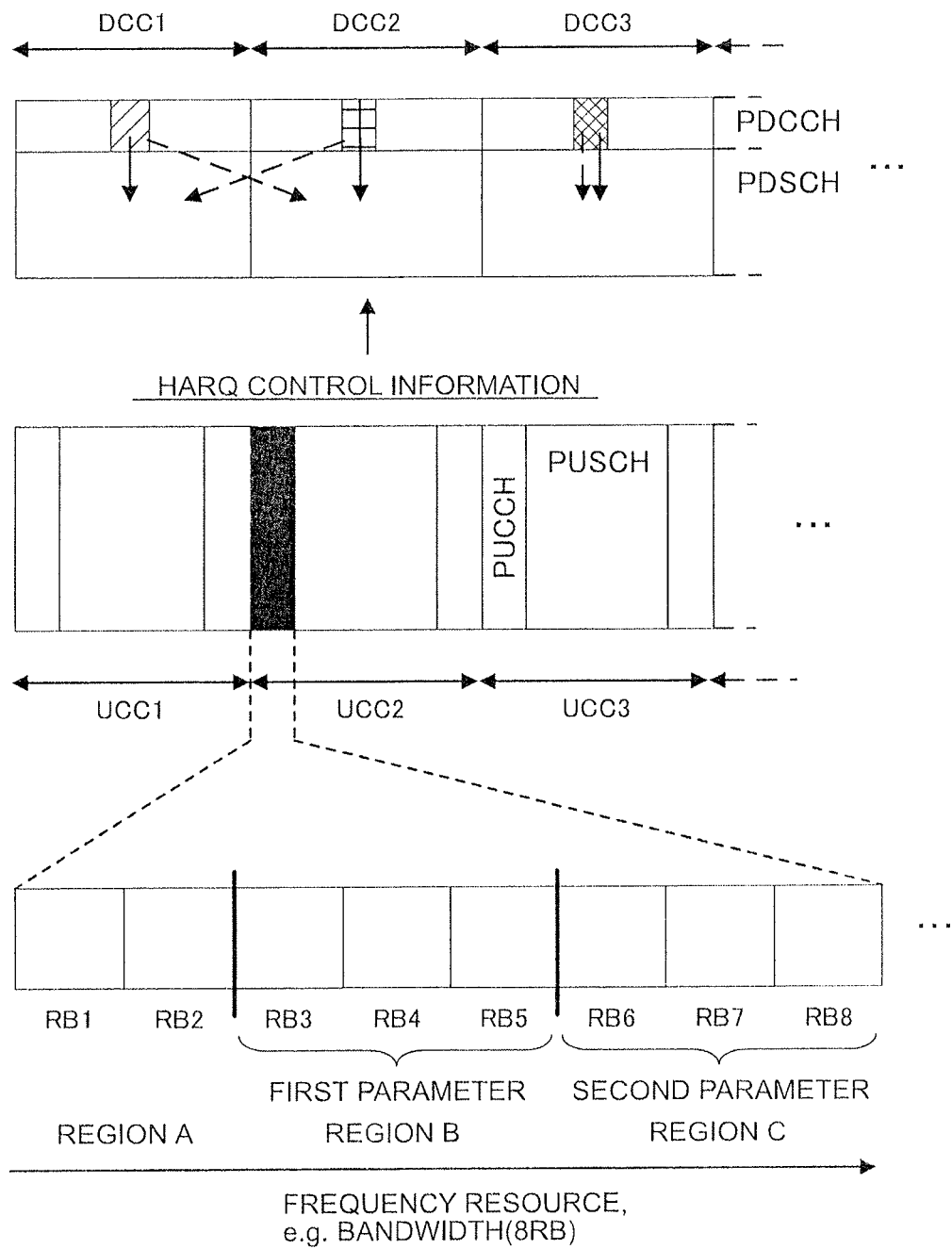
FIG. 4 is a diagram showing an example of a mobile communication system to which a first embodiment and a second embodiment can be applied.
Figure 9:
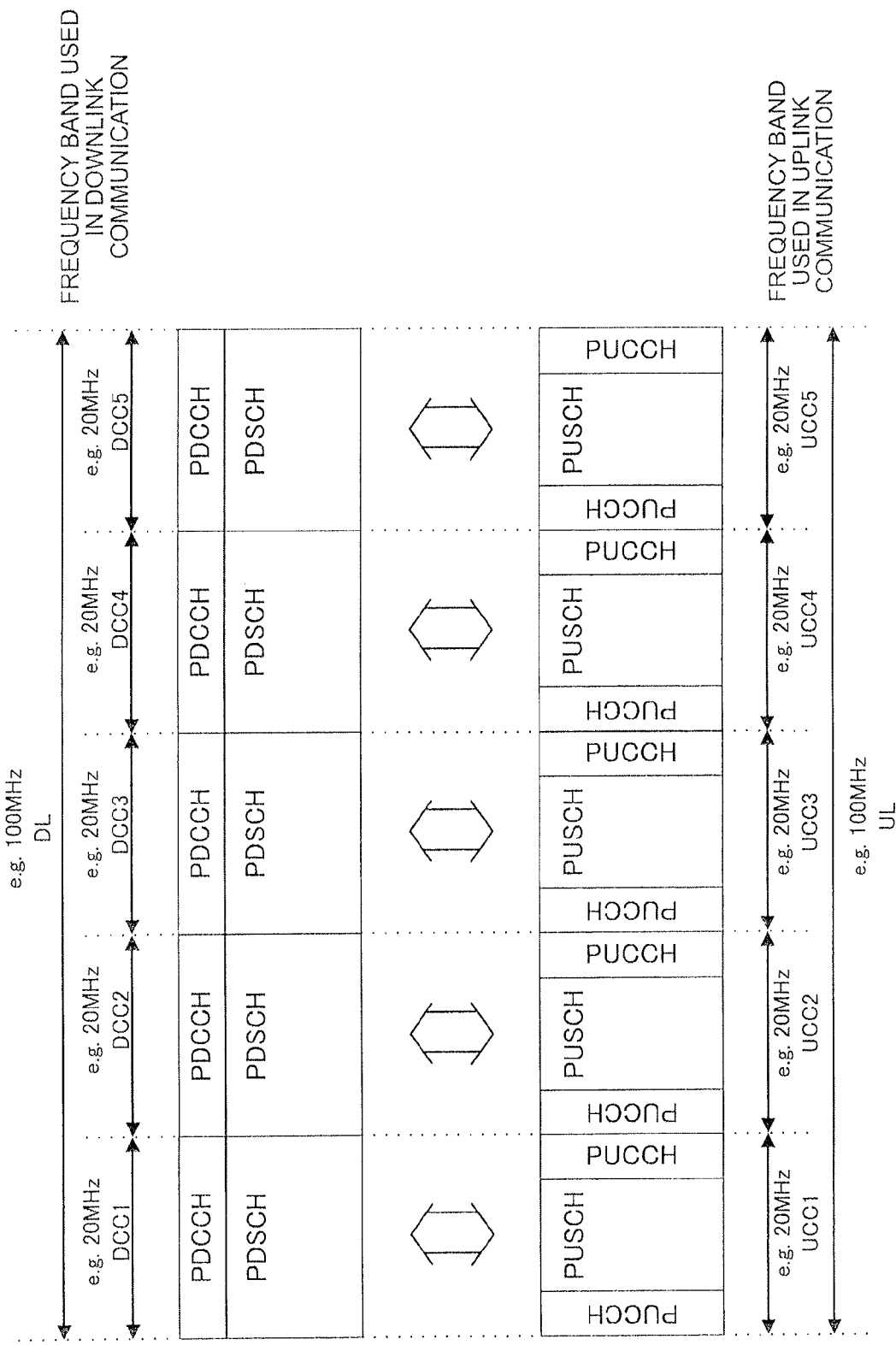
FIG. 9 is a diagram showing an example of frequency band aggregation in a conventional technology.
Figure 10:
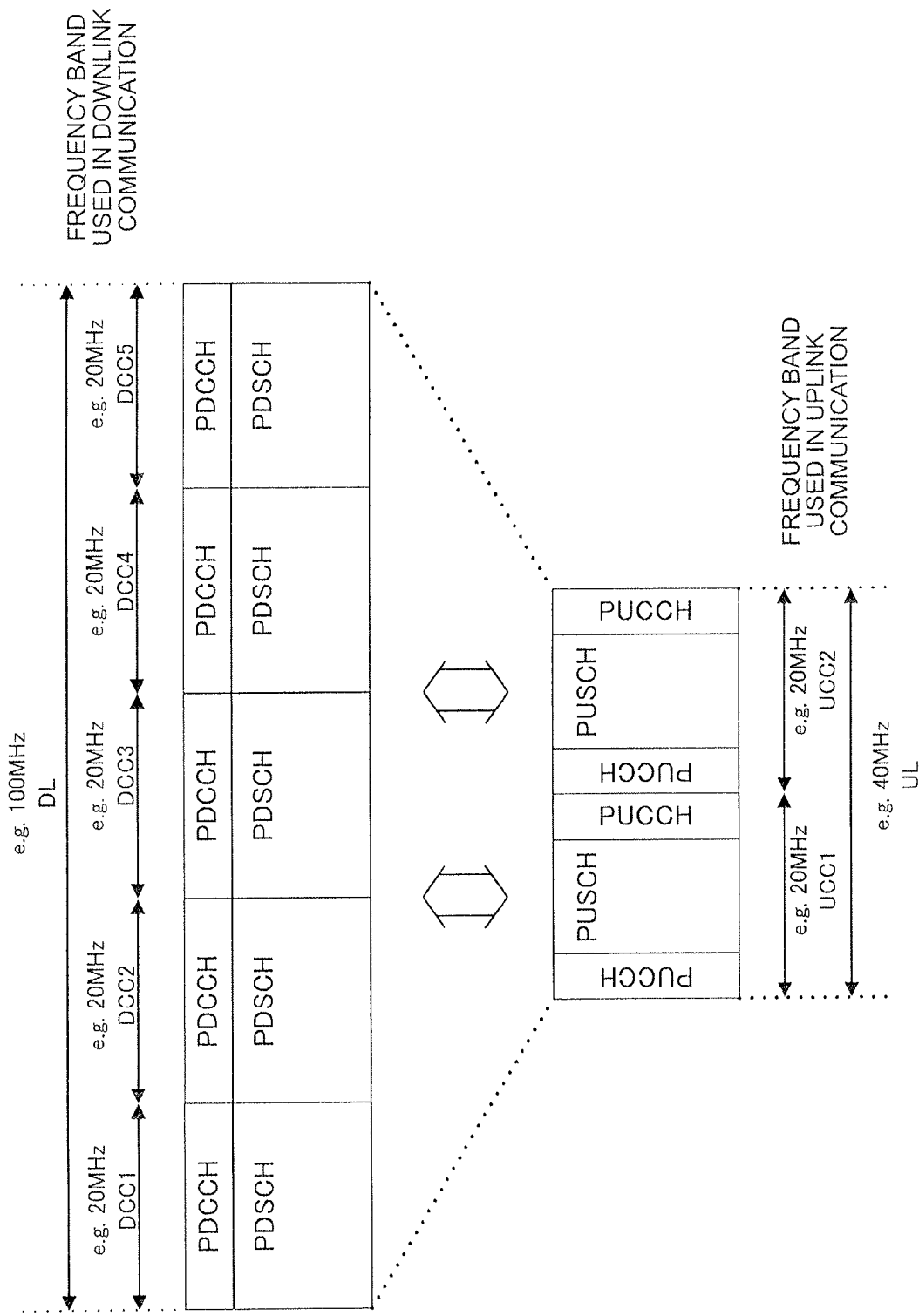
FIG. 10 is a diagram showing an example of asymmetric frequency band aggregation in the conventional technology.
Figure 11:
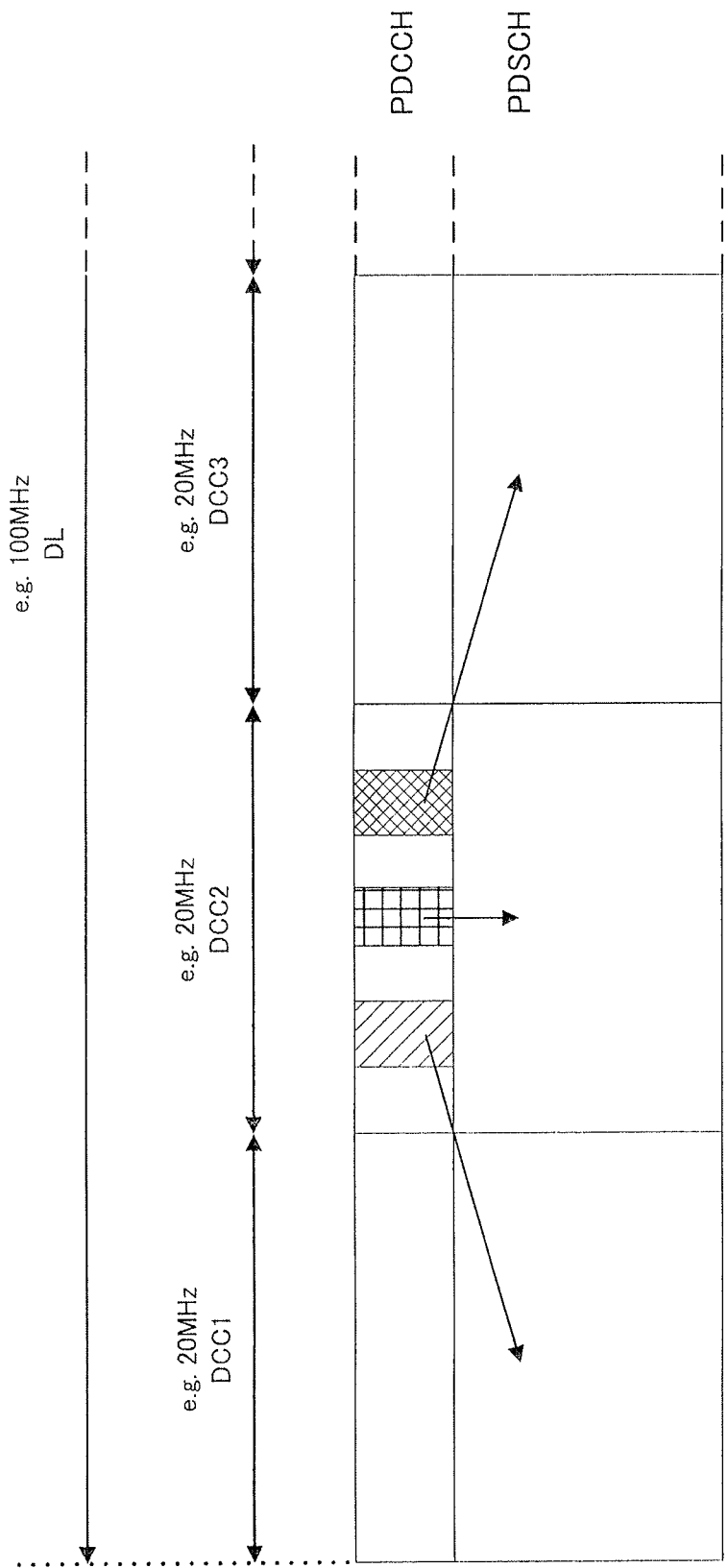
FIG. 11 is a diagram showing an example of a method of using a physical downlink control channel to allocate a physical downlink shared channel in the conventional technology.

FIG. 4 is a diagram showing an example of a mobile communication system to which the first embodiment can be applied. FIG. 4 shows an enlarged part of FIG. 9 and FIG. 10 for ease of illustration of the first embodiment. That is, the first embodiment can be applied to any of the symmetrically carrier-aggregated and asymmetrically carrier-aggregated mobile communication systems. In the following description, as an example, only component carriers in the enlarged part will be discussed; needless to say, the same embodiment can be applied to all the component carriers.

FIG. 4 shows, as an example of the description of the first embodiment, three downlink component carriers (DCC1, DCC2 and DCC3). FIG. 4 also shows three uplink component carriers (UCC1, DCC2 and UCC3).

In FIG. 4, the base station apparatus 100 uses (one or a plurality of) PDCCHs on the downlink component carriers, and allocates (schedules) (one or a plurality of) PDSCHs in the same sub-frame. Here, the base station apparatus 100 cannot allocate, with one PDCCH, a plurality of PDSCHs in the same sub-frame.

The base station apparatus 100 can allocate the PDSCH on the same component carrier as the component carrier where the PDCCH is mapped. FIG. 4 shows as an example with a solid line that the base station apparatus 100 uses the PDCCH (PDCCH indicated by oblique lines) on DCC1 to allocate the PDSCH on DCC1. FIG. 4 also shows with a solid line that the base station apparatus 100 uses the PDCCH (PDCCH indicated by grid lines) on DCC2 to allocate the PDSCH on DCC2. FIG. 4 also shows with a solid line that the base station apparatus 100 uses the PDCCH (PDCCH indicated by mesh lines) on DCC3 to allocate the PDSCH on DCC3.

In FIG. 4, the base station apparatus 100 can allocate the PDSCH which is on a component carrier that is the same as or different from the component carrier where the PDCCH is mapped. For example, the base station apparatus 100 transmits, to the mobile station apparatus 200, a component Carrier Indicator Field (CIF; for example, an information field represented by three bits) on the PDCCH, and thereby can allocate the PDSCH on a component carrier that is the same as or different from the component carrier where the PDCCH is mapped. In other words, the base station apparatus 100 transmits, on the PDCCH, the component carrier indicator field indicating the component carrier where the PDSCH allocated using the PDCCH is mapped, transmits it and allocates, to the mobile station apparatus 200, the PDSCH on the component carrier that is the same as or different from the component carrier where the PDCCH is mapped.

Here, what value is indicated by a component carrier indicator field transmitted from the base station apparatus 100 and that the PDSCH on which corresponding component carrier is accordingly allocated are previously specified, and this is known information between the base station apparatus 100 and the mobile station apparatus 200.

For example, the base station apparatus 100 transmits, on the PDCCH, a component carrier indicator field indicating a specific value (for example, an information field represented by three bits indicates "000"), transmits it to the mobile station apparatus 200 and thereby allocates, to the mobile station apparatus 200, the PDSCH on the same component carrier as the component carrier where the PDCCH is mapped. The base station apparatus 100 transmits, on the PDCCH, a component carrier indicator field indicating a value other than the specific value (for example, an information field represented by three bits indicates a value other than "000"), transmits it and thereby allocates, to the mobile station apparatus 200, the PDSCH on a component carrier different from the component carrier where the PDCCH is mapped.

FIG. 4 shows as an example with a dotted line that the base station apparatus 100 uses the PDCCH (PDCCH indicated by oblique lines) on DCC1 to allocate the PDSCH on DCC2. FIG. 4 also shows with a dotted line that the base station apparatus 100 uses the PDCCH (PDCCH indicated by grid lines) on DCC2 to allocate the PDSCH on DCC1. FIG. 4 also shows with a dotted line that the base station apparatus 100 uses the PDCCH (PDCCH indicated by mesh lines) on DCC3 to allocate the PDSCH on DCC3.

Furthermore, the base station apparatus 100 can set, for each of the mobile station apparatuses 200, information indicating whether or not the component carrier indicator field is transmitted on the PDCCH. For example, the base station apparatus 100 includes, in the RRC signaling, information indicating whether or not the component carrier indicator field is transmitted on the PDCCH, and sets the information to the mobile station apparatus 200. The base station apparatus 100 also can set, for each of the component carriers, information indicating whether or not the component carrier indicator field is transmitted on the PDCCH. For example, the base station apparatus 100 includes, for each of the component carriers, in the RRC signaling, information indicating whether or not the component carrier indicator field is transmitted on the PDCCH, and sets the information to the mobile station apparatus 200.

In FIG. 4, the base station apparatus 100 uses the PDSCH allocated using the PDCCH to transmit the downlink transport block to the mobile station apparatus 200. For example, the base station apparatus 100 uses the PDSCHs allocated using the PDCCHs respectively on DCC1, DCC2 and DCC3 to transmit, to the mobile station apparatus 200, downlink transport blocks (up to three and corresponding to the number of downlink component carriers) in the same sub-frame.

Here, the base station apparatus 100 can set, specific to a cell, the correspondence (link: linkage) between the downlink component carrier and the uplink component carrier. For example, the base station apparatus 100 can use broadcast information (broadcast channel) to set the correspondence between the downlink component carrier and the uplink component carrier to the mobile station apparatus 200. Moreover, the base station apparatus 100 can set, specific to the mobile station apparatus, the correspondence between the downlink component carrier and the uplink component carrier. For example, the base station apparatus 100 can use the RRC signaling to set the correspondence between the downlink component carrier and the uplink component carrier to the mobile station apparatus 200.

In FIG. 4, the mobile station apparatus 200 uses the PUSCH allocated using the PDCCH (which may be the uplink transmission permission signal) transmitted from the base station apparatus 100 to transmit the uplink transport block to the base station apparatus 100. For example, the mobile station apparatus 200 uses the PUSCHs on UCC1, DCC2 and DCC3 to transmit, to the base station apparatus 100, uplink transport blocks (up to three and corresponding to the number of uplink component carriers) in the same sub-frame.

In FIG. 4, the mobile station apparatus 200 uses the PUCCH to transmit, to the base station apparatus 100, the HARQ control information for the PDCCH and/or the downlink transport block transmitted from the base station apparatus 100.

Here, the base station apparatus 100 can set the uplink component carrier for the mobile station apparatus 200 to transmit the HARQ control information. For example, the base station apparatus 100 uses the RRC signaling to set, to the mobile station apparatus 200, one uplink component carrier for the mobile station apparatus 200 to transmit the HARQ control information. FIG. 4 shows, as an example, that the base station apparatus 100 sets UCC2 as the uplink component carrier for the mobile station apparatus 200 to transmit the HARQ control information. The mobile station apparatus 200 uses the PUCCH on UCC2 set by the base station apparatus 100 to transmit the HARQ control information.

In FIG. 4, a region that is extended with a dotted line from the PUCCH (PUCCH resource region indicated by a dotted pattern) on UCC2 conceptually shows the PUCCH on UCC2. Here, for ease of illustration, a horizontal direction is assumed to be a frequency resource (which may be represented as a bandwidth), and an orthogonal resource described later is not illustrated.

In FIG. 4, the base station apparatus 100 transmits the first parameter specifying the first region (region B indicated by RB3 to RB5) where the mobile station apparatus 200 can utilize the PUCCH. In other words, the base station apparatus 100 can specify, from the PUCCH resource region on UCC2, the first region for the mobile station apparatus 200 to transmit the HARQ control information. For example, the base station apparatus 100 transmits, using the RRC signaling, the first parameter, and thereby specifies the first region specific to the mobile station apparatus. Moreover, for example, the base station apparatus 100 transmits, using the broadcast channel, the first parameter, and thereby specifies the first region specific to the cell.

For example, the base station apparatus 100 transmits, as the first parameter, the bandwidth of the PUCCH resource, and thereby specifies the first region. Moreover, for example, the base station apparatus 100 transmits, as the first parameter, information indicating the orthogonal resource described later, and thereby specifies the first region. Here, the base station apparatus 100 may also notify (set), as the first parameter, a starting position for the first region, and thereby specify the first region. Moreover, the mobile station apparatus 200 may receive the first parameter from the base station apparatus 100, and thereby recognize region A (region A represented by RB1 and RB2).

In FIG. 4, the base station apparatus 100 transmits the second parameter specifying the second region (region C indicated by RB6 to RB8) where the mobile station apparatus 200 can utilize the PUCCH. In other words, the base station apparatus 100 can specify, from the PUCCH resource region, the second region for the mobile station apparatus 200 to transmit the HARQ control information. For example, the base station apparatus 100 transmits, using the RRC signaling, the second parameter, and thereby specifies the second region specific to the mobile station apparatus. Moreover, for example, the base station apparatus 100 transmits, using the broadcast channel, the second parameter, and thereby specifies the second region specific to the cell.

For example, the base station apparatus 100 transmits, as the second parameter, the bandwidth of the PUCCH resource, and thereby specifies the second region. Moreover, for example, the base station apparatus 100 transmits, as the second parameter, information indicating the orthogonal resource described later, and thereby specifies the second region. Here, the base station apparatus 100 may notify (set), as the second parameter, a starting position for the second region, and thereby specify the second region.

For example, in FIG. 4, the base station apparatus 100 can transmit, using the RCC signaling, the first parameter specifying the first region where the mobile station apparatus 200 can utilize the PUCCH, to the mobile station apparatus 200, and can transmit, using the broadcast channel, the second parameter specifying the second region where the mobile station apparatus 200 can utilize the PUCCH, to the mobile station apparatus 200. The base station apparatus 100 transmits the first parameter and the second parameter in this way, and thus it is possible to set, for each of the mobile station apparatuses 200, the first region where the mobile station apparatus 200 can utilize the PUCCH and set, for each of the cells, the second region where the mobile station apparatus 200 can utilize the PUCCH.

Furthermore, in FIG. 4, the base station apparatus 100 can allocate, using the RRC signaling, the PUCCH for the mobile station apparatus 200 to transmit the HARQ control information. In other words, the base station apparatus 100 can use the RRC signaling to indicate which PUCCH within each of the first region and the second region specified for the mobile station apparatus 200 is used to transmit the HARQ control information.

Moreover, the base station apparatus 100 can allocate the PUCCH for the mobile station apparatus 200 to transmit the HARQ control information in association with the PDCCH. In other words, the base station apparatus 100 can indicate which PUCCH within each of the first region and the second region specified for the mobile station apparatus 200 is used to transmit the HARQ control information in association with the PDCCH.

For example, the base station apparatus 100 can, depending on a position in the PDCCH resource region of the PDCCH on the downlink component carrier, indicate which PUCCH within each of the first region and the second region the mobile station apparatus 200 uses to transmit the HARQ control information. In other words, the mobile station apparatus 200 maps, based on how the PDCCH transmitted from the base station apparatus 100 is mapped in the PDCCH resource region, the HARQ control information on the PUCCH within each of the first region and the second region, and transmits it to the base station apparatus 100. Here, the correspondence between the PDCCH transmitted from the base station apparatus 100 and the PUCCH within each of the first region and the second region is specified by associating a CCE index which is a head of the CCEs constituting the PDCCH with the index of the PUCCH within each of the first region and the second region.

In FIG. 4, the mobile station apparatus 200 uses the PUCCH allocated by the base station apparatus 100 to transmit the HARQ control information to the base station apparatus 100.

Here, in case that the base station apparatus 100 uses a plurality of PDCCHs to allocate a plurality of PDSCHs in the same sub-frame, the mobile station apparatus 200 uses the first region to transmit the HARQ control information. Here, the mobile station apparatus 200 uses the region A (region A represented by RB1 and RB2) to transmit, for example, the CSI or the CQI to the base station apparatus 100.

For example, in FIG. 4, in case that the base station apparatus 100 uses the PDCCHs on DCC1, DCC2 and DCC3 respectively to allocate three PDSCHs in the same sub-frame, the mobile station apparatus 200 uses the first region to transmit the HARQ control information. For example, in case that the base station apparatus 100 uses two PDCCHs on DCC2 to allocate two PDSCHs in the same sub-frame, the mobile station apparatus 200 uses the first region to transmit the HARQ control information.

In FIG. 4, in case that the base station apparatus 100 uses one PDCCH to allocate one PDSCH, the mobile station apparatus 200 uses the first region or the second region to transmit the HARQ control information.

Here, in case that the base station apparatus 100 uses one PDCCH on a component carrier other than the specific component carrier to allocate one PDSCH, the mobile station apparatus 200 uses the first region to transmit the HARQ control information. In case that the base station apparatus 100 uses one PDCCH on the specific component carrier to allocate one PDSCH, the mobile station apparatus 200 uses the second region to transmit the HARQ control information.

In FIG. 4, the base station apparatus 100 can set the specific downlink component carrier for the mobile station apparatus 200. For example, the base station apparatus 100 uses the broadcast channel to set the specific downlink component carrier for the mobile station apparatus 200. For example, the base station apparatus 100 uses the RRC signaling to set the specific downlink component carrier for the mobile station apparatus 200.

In other words, in case that the base station apparatus 100 uses one PDCCH on a component carrier other than the set specific downlink component carrier to allocate one PDSCH, the mobile station apparatus 200 uses the first region to transmit the HARQ control information. In case that the base station apparatus 100 uses one PDCCH on the set specific downlink component carrier to allocate one PDSCH, the mobile station apparatus 200 uses the second region to transmit the HARQ control information.

For example, in FIG. 4, in case that the base station apparatus 100 uses the broadcast channel to set DCC2 as the specific downlink component carrier and uses one PDCCH on DCC1 or DCC3 to allocate one PDSCH, the mobile station apparatus 200 uses the first region to transmit the HARQ control information. For example, in case that the base station apparatus 100 uses the RRC signaling to set DCC2 as the specific downlink component carrier and uses one PDCCH on DCC1 or DCC3 to allocate one PDSCH, the mobile station apparatus 200 uses the first region to transmit the HARQ control information.

For example, in case that the base station apparatus 100 uses the broadcast channel to set DCC2 as the specific downlink component carrier and uses one PDCCH on DCC2 to allocate one PDSCH, the mobile station apparatus 200 uses the second region to transmit the HARQ control information. For example, in case that the base station apparatus 100 uses the RRC signaling to set DCC2 as the specific downlink component carrier and uses one PDCCH on DCC2 to allocate one PDSCH, the mobile station apparatus 200 uses the second region to transmit the HARQ control information.

Here, in case that the base station apparatus 100 uses a plurality of PDCCHs on the specific downlink component carrier to allocate a plurality of PDSCHs in the same sub-frame, the mobile station apparatus 200 uses the first region to transmit the HARQ control information.

In other words, the mobile station apparatus 200 uses the first region to transmit, to the base station apparatus 100, the HARQ control information for a plurality of PDCCHs and/or the downlink transport block transmitted on a plurality of PDSCHs. The mobile station apparatus 200 also uses the first region to transmit, to the base station apparatus 100, the HARQ control information for one PDCCH on a component carrier other than the specific component carrier and/or the downlink transport block transmitted on one PDSCH.

In other words, in case that the base station apparatus 100 uses a plurality of PDCCHs to allocate a plurality of PDSCHs in the same sub-frame or in case that the base station apparatus 100 uses one PDCCH on a component carrier other than the specific component carrier to allocate one PDSCH, the mobile station apparatus 200 uses the first region to transmit the HARQ control information.

The mobile station apparatus 200 uses the second region to transmit, to the base station apparatus 100, the HARQ control information for one PDCCH on the specific component carrier and/or the downlink transport block transmitted on one PDSCH.

Here, in FIG. 4, the base station apparatus 100 and the mobile station apparatus 200 can recognize that the downlink component carrier corresponding to the uplink component carrier set, by the base station apparatus 100, as the uplink component carrier on which the HARQ control information is transmitted is the specific downlink component carrier.

In other words, in FIG. 4, in case that the base station apparatus 100 uses the PDCCH on a component carrier other than the downlink component carrier corresponding to the uplink component carrier set as the uplink component carrier on which the HARQ control information is transmitted to allocate the PDSCH, the mobile station apparatus 200 uses the first region to transmit the HARQ control information. In case that the base station apparatus 100 uses the PDCCH on the downlink component carrier corresponding to the uplink component carrier set as the uplink component carrier on which the HARQ control information is transmitted to allocate the PDSCH, the mobile station apparatus 200 uses the second region to transmit the HARQ control information.

For example, in FIG. 4, in case that the base station apparatus 100 uses the broadcast channel to associate DCC2 with UCC2, and uses the PDCCH on DCC1 or DCC3 to allocate the PDSCH, the mobile station apparatus 200 uses the first region to transmit the HARQ control information. For example, in case that the base station apparatus 100 uses the RRC signaling to associate DCC2 with UCC2, and uses the PDCCH on DCC1 or DCC3 to allocate the PDSCH, the mobile station apparatus 200 uses the first region to transmit the HARQ control information.

For example, in case that the base station apparatus 100 uses the broadcast channel to associate DCC2 with UCC2, and uses the PDCCH on DCC2 to allocate the PDSCH, the mobile station apparatus 200 uses the second region to transmit the HARQ control information. For example, in case that the base station apparatus 100 uses the RRC signaling to associate DCC2 with UCC2, and uses the PDCCH on DCC2 to allocate the PDSCH, the mobile station apparatus 200 uses the second region to transmit the HARQ control information.

Here, as described above, in FIG. 4, the base station apparatus 100 sets UCC2 as the uplink component carrier on which the mobile station apparatus 200 transmits the HARQ control information.

As described above, in case that the base station apparatus 100 uses a plurality of PDCCHs on the specific downlink component carrier to allocate a plurality of PDSCHs in the same sub-frame, the mobile station apparatus 200 uses the first region to transmit the HARQ control information.

Furthermore, in FIG. 4, the base station apparatus 100 and the mobile station apparatus 200 can consider that a downlink component carrier used for performing the initial connection establishment is the specific downlink component carrier. For example, the base station apparatus 100 and the mobile station apparatus 200 can consider that a downlink component carrier used for performing a random access procedure is the specific downlink component carrier.

In other words, in FIG. 4, in case that the base station apparatus 100 uses the PDCCH on a component carrier other than the downlink component carrier used for performing the initial connection establishment to allocate the PDSCH, the mobile station apparatus 200 uses the first region to transmit the HARQ control information. In case that the base station apparatus 100 uses the PDCCH on the downlink component carrier used for performing the initial connection establishment to allocate the PDSCH, the mobile station apparatus 200 uses the second region to transmit the HARQ control information.

For example, in FIG. 4, in case that the base station apparatus 100 uses the PDCCH on DCC1 or DCC3 to allocate the PDSCH, the mobile station apparatus 200 that performs, on DCC2, the initial connection establishment to the base station apparatus 100, uses the first region to transmit the HARQ control information. For example, in case that the base station apparatus 100 uses the PDCCH on DCC2 to allocate the PDSCH, the mobile station apparatus 200 that performs, on DCC2, the initial connection establishment to the base station apparatus 100, uses the second region to transmit the HARQ control information.

Here, as described above, in case that the base station apparatus 100 uses a plurality of PDCCHs on the specific downlink component carrier to allocate a plurality of PDSCHs in the same sub-frame, the mobile station apparatus 200 uses the first region to transmit the HARQ control information.

In FIG. 4, the mobile station apparatus 200, in case of transmitting the HARQ control information by using the first region, uses the first transmission format to transmit the HARQ control information to the base station apparatus 100. In other words, the base station apparatus 100 transmits, to the mobile station apparatus 200, the first parameter specifying the first region where the mobile station apparatus 200 can utilize the first transmission format; the mobile station apparatus 200 uses the first transmission format in the first region to transmit the HARQ control information to the base station apparatus 100.

Furthermore, the mobile station apparatus 200, in case of transmitting the HARQ control information by using the second region, uses the second transmission format to transmit the HARQ control information to the base station apparatus 100. In other words, the base station apparatus 100 transmits, to the mobile station apparatus 200, the second parameter specifying the second region where the mobile station apparatus 200 can utilize the second transmission format and which is different from the first region; the mobile station apparatus 200 uses the second transmission format in the second region to transmit the HARQ control information to the base station apparatus 100.

In other words, in case that the base station apparatus 100 uses a plurality of PDCCHs to allocate a plurality of PDSCHs in the same sub-frame, the mobile station apparatus 200 uses the first transmission format to transmit the HARQ control information. In case that the base station apparatus 100 uses one PDCCH to allocate one PDSCH, the mobile station apparatus 200 uses the first transmission format or the second transmission format to transmit the HARQ control information.

In case that the base station apparatus 100 uses one PDCCH on a component carrier other than the specific component carrier to allocate one PDSCH, the mobile station apparatus 200 uses the first transmission format to transmit the HARQ control information. In other words, in case that the base station apparatus 100 uses a plurality of PDCCHs to allocate a plurality of PDSCHs in the same sub-frame or in case that the base station apparatus 100 uses one PDCCH on a component carrier other than the specific component carrier to allocate one PDSCH, the mobile station apparatus 200 uses the first transmission format to transmit the HARQ control information.

In case that the base station apparatus 100 uses one PDCCH on the specific component carrier to allocate one PDSCH, the mobile station apparatus 200 uses the second transmission format to transmit the HARQ control information.

Here, the mobile station apparatus 200 uses the first transmission format, and thereby can transmit uplink control information having a larger amount of information than uplink control information (which may be the HARQ control information) that can be transmitted using the second transmission format.

For example, the mobile station apparatus 200 uses the first transmission format to transmit, to the base station apparatus 100, the HARQ control information for a plurality of PDCCHs and/or a plurality of downlink transport blocks transmitted on each of DCC1, DCC2 and DCC3. Here, for example, the mobile station apparatus 200 uses the second transmission format to transmit, to the base station apparatus 100, the HARQ control information for one PDCCH and/or one downlink transport block transmitted on DCC2. In other words, it is possible to increase the number of information bits per sub-frame that can be transmitted using the first transmission format as compared with the number of information bits per sub-frame that can be transmitted using the second transmission format.

The mobile station apparatus 200 can apply, to the uplink control information (which may be the HARQ control information) transmitted using the first transmission format, for a modulation scheme that has a higher modulation level than a modulation scheme which is applied to the uplink control information transmitted using the second transmission format.

For example, the mobile station apparatus 200 uses the first transmission format and applies to the uplink control information for 8 Phase Shift Keying (8PSK) or Quadrature Amplitude Modulation (QAM), and transmit the information to the base station apparatus 100. Here, for example, the mobile station apparatus 200 uses the second transmission format and applies to the uplink control information for Binary Phase Shift Keying (BPSK) or Quadrature Phase Shift Keying (QPSK), and transmit the information to the base station apparatus 100. In other words, it is possible to apply, to the uplink control information transmitted using the first transmission format, for a modulation scheme having a higher modulation level than a modulation scheme which is applied to the uplink information transmitted using the second transmission format. In other words, it is possible to increase the amount of information per symbol that can be transmitted using the first transmission format as compared with the amount of information per symbol that can be transmitted using the second transmission format.

The mobile station apparatus 200 can configure (generate), in different methods, an orthogonal resource of the PUCCH transmitted using the first transmission format (PUCCH where the uplink control information (which may be the HARQ control information) transmitted using the first transmission format is mapped) and an orthogonal resource of the PUCCH transmitted using the second transmission format (PUCCH where the uplink control information transmitted using the second transmission format is mapped).

Here, the base station apparatus 100 may specify, for the mobile station apparatus 200, method of configuring (method of generating) the orthogonal resource of the PUCCH transmitted using the first transmission format and the orthogonal resource of the PUCCH transmitted using the second transmission format. In other words, it is possible to configure, in different methods, the orthogonal resource of the PUCCH transmitted using the first transmission format and the orthogonal resource of the PUCCH transmitted using the second transmission format.

Figure 5:
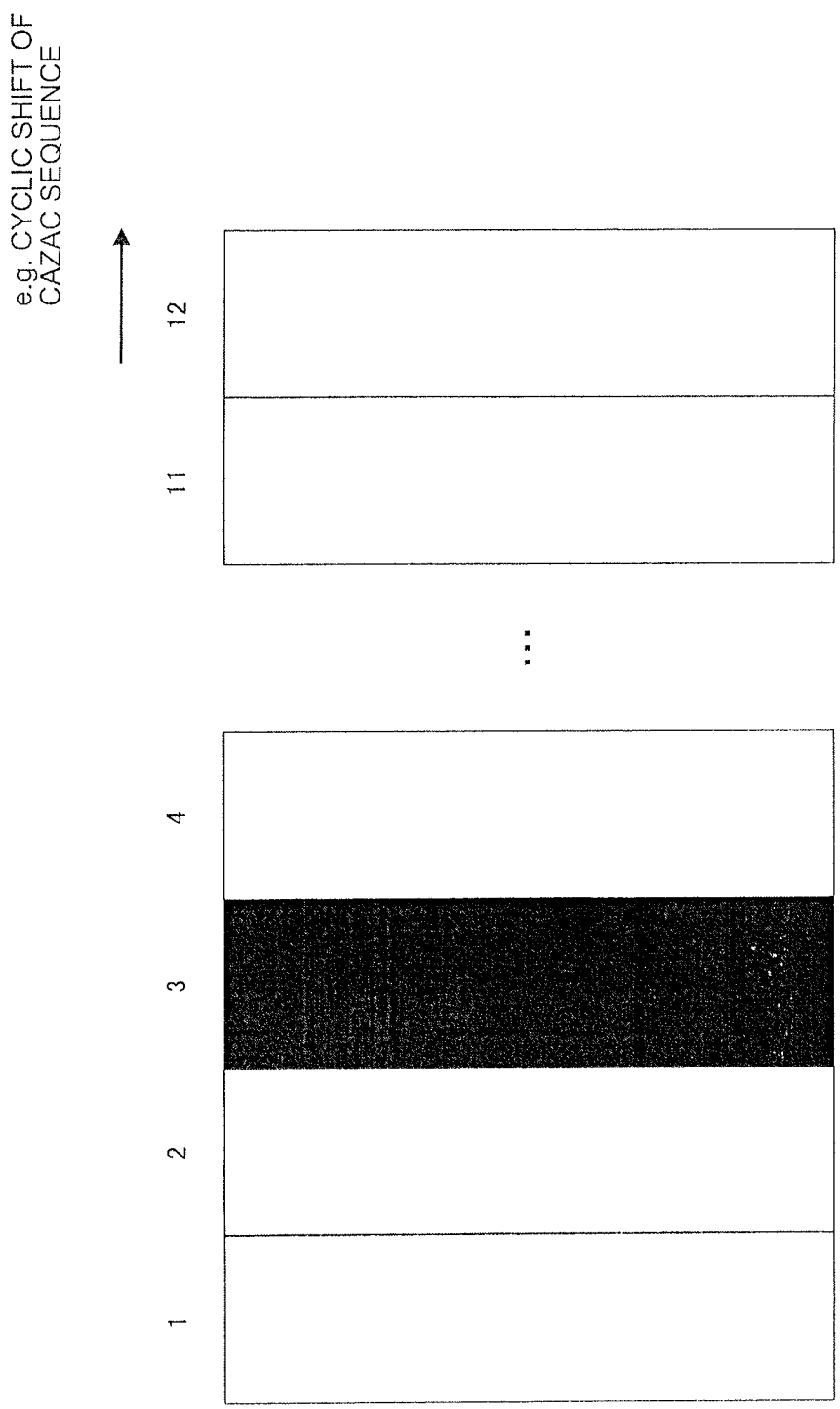
FIG. 5 is a diagram showing an example of the configuration of an orthogonal resource in a physical uplink control channel.

FIG. 5 is a diagram conceptually showing a configuration example of the orthogonal resource of the PUCCH used in case that the mobile station apparatus 200 transmits the uplink control information. FIG. 5 shows, as a configuration example of the orthogonal resource, a cyclic shift of a CAZAC sequence in a horizontal direction (shows a cyclic shift of a CAZAC sequence represented by numbers from 1 to 12).

For example, the mobile station apparatus 200 uses the orthogonal resource (orthogonal resource which is indicated by being blackened and in which the number of the cyclic shifts of the CAZAC sequence is three) of the PUCCH to transmit the uplink control information. In other words, the mobile station apparatus 200 can perform, on the PUCCH, the cyclic shift of the CAZAC sequence in a frequency direction to thereby orthogonalize the resource, and can use the orthogonalized resource to transmit the uplink control information.

Figure 6:
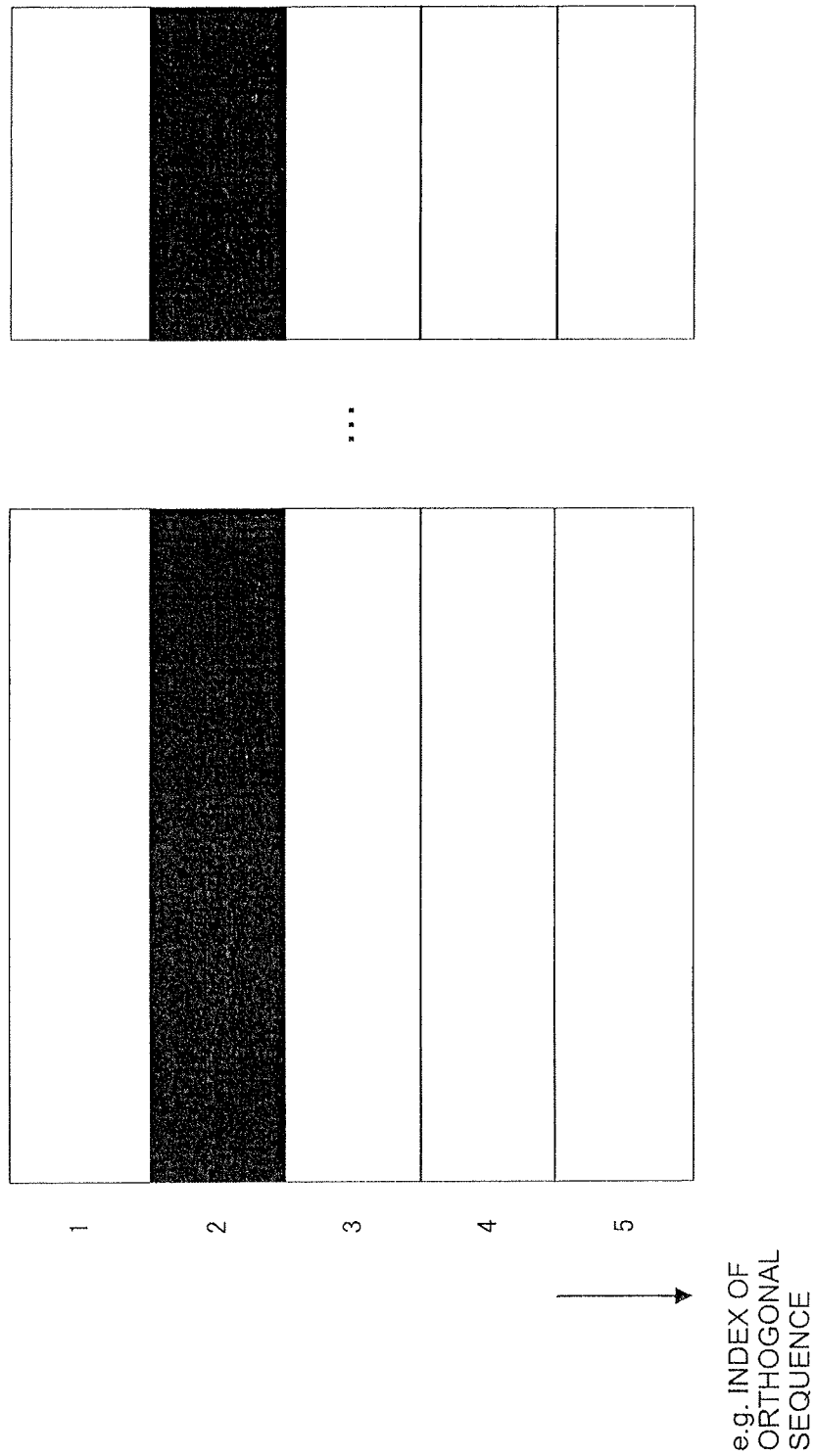
FIG. 6 is a diagram showing another example of the configuration of the orthogonal resource in the physical uplink control channel.

Likewise, FIG. 6 is a diagram conceptually showing a configuration example of the orthogonal resource of the PUCCH used in case that the mobile station apparatus 200 transmits the uplink control information. FIG. 6 shows, as a configuration example of the orthogonal resource, an index of an orthogonal sequence (orthogonal symbol) in a vertical direction (shows the index of the orthogonal sequence represented by numbers from 1 to 5).

For example, the mobile station apparatus 200 uses the orthogonal resource (orthogonal resource which is indicated by being blackened and in which the index of the orthogonal sequence is two) to transmit the uplink control information. In other words, the mobile station apparatus 200 can perform, on the PUCCH, the orthogonal sequence in a time direction to thereby orthogonalize the resource, and can use the orthogonalized resource to transmit the uplink control information.

Figure 7:
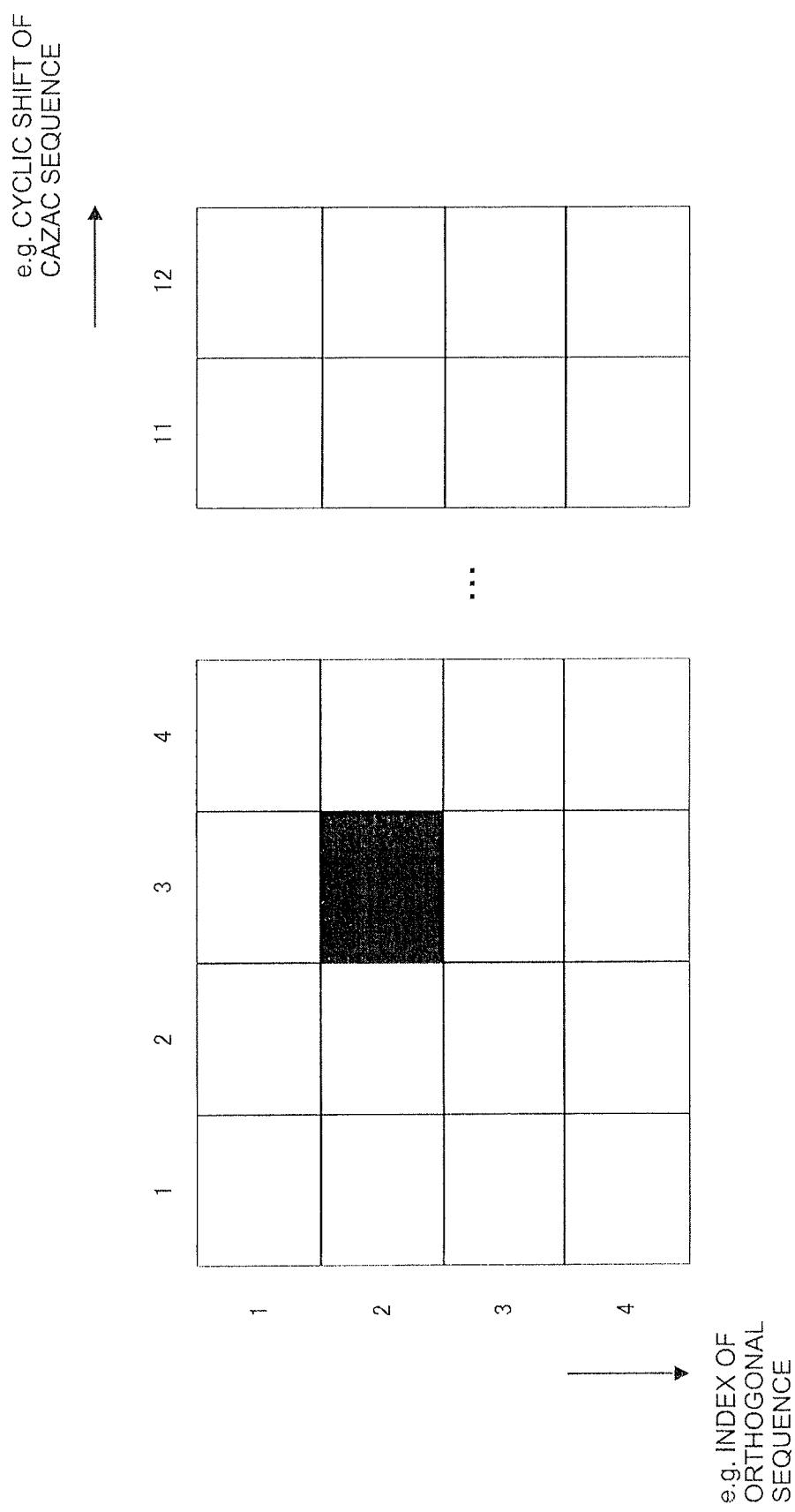
FIG. 7 is a diagram showing another example of the configuration of the orthogonal resource in the physical uplink control channel.

Likewise, FIG. 7 is a diagram conceptually showing a configuration example of the orthogonal resource of the PUCCH used in case that the mobile station apparatus 200 transmits the uplink control information. FIG. 7 shows, as a configuration example of the orthogonal resource, the cyclic shift of the CAZAC sequence in the horizontal direction and the index of the orthogonal sequence in the vertical direction (shows the cyclic shift of the CAZAC sequence represented by numbers from 1 to 12 and the index of the orthogonal sequence represented by numbers from 1 to 4).

For example, the mobile station apparatus 200 uses the orthogonal resource (orthogonal resource which is indicated by being blackened and in which the number of the cyclic shifts of the CAZAC sequence is three and the index of the orthogonal sequence is two) of the PUCCH to transmit the uplink control information. In other words, the mobile station apparatus 200 can perform, on the PUCCH, the cyclic shift of the CAZAC sequence in the frequency direction and the orthogonal sequence in the time direction to thereby orthogonalize the resource, and can use the orthogonalized resource to transmit the uplink control information.

In FIG. 4, the mobile station apparatus 200 uses the first transmission format or the second transmission format in the orthogonal resource of the PUCCH configured by the configuration method described above to transmit the uplink control information (which may be the HARQ control information) to the base station apparatus 100.

For example, the mobile station apparatus 200 can use the first transmission format in the orthogonal resource of the PUCCH configured with the orthogonal sequence shown in FIG. 6 to transmit the uplink control information. For example, the mobile station apparatus 200 can use the second transmission format in the orthogonal resource of the PUCCH configured with the cyclic shift of the CAZAC sequence and the orthogonal sequence shown in FIG. 7 to transmit the uplink control information.

Here, in the mobile communication system, the number of resources that can be orthogonalized is associated with the number of mobile station apparatuses 200 that can transmit information in a certain timing (the number of mobile station apparatuses 200 that can be multiplexed). For example, when, as shown in FIG. 5, the cyclic shift of the CAZAC sequence in the orthogonal resource is 12, it is possible to multiplex up to 12 mobile station apparatuses 200. Likewise, for example, when, as shown in FIG. 6, the index of the orthogonal sequence in the orthogonal resource is five, it is possible to multiplex up to 5 mobile station apparatuses 200. Likewise, for example, when, as shown in FIG. 7, the cyclic shift of the CAZAC sequence in the orthogonal resource is 12 and the index of the orthogonal sequence is 4, it is possible to multiplex up to 48 (12×4) mobile station apparatuses 200.

The base station apparatus 100 gives, within a cell to be controlled, consideration to the conditions of the downlink resource and the uplink resource, the number of mobile station apparatuses 200 that perform communication using a plurality of component carriers, the number of mobile station apparatuses 200 that perform communication using one component carrier and the like, and thus the mobile station apparatus 200 can specify the method of configuring the orthogonal resource of the first transmission format and/or the second transmission format in which the uplink control information is transmitted.

Here, as described above, the base station apparatus 100 can also transmit information indicating the orthogonal resource as the first parameter specifying the first region where the mobile station apparatus 200 can utilize the PUCCH and the second parameter specifying the second region where the mobile station apparatus 200 can utilize the PUCCH. The base station apparatus 100 can also transmit information indicating the orthogonal resource as the first parameter specifying the first region where the mobile station apparatus 200 can utilize the first transmission format and the second parameter specifying the second region where the mobile station apparatus 200 can utilize the second transmission format.

For example, the base station apparatus 100 transmits, as the first parameter and the second parameter, information indicating the number of cyclic shifts of the CAZAC sequence and information indicating the index of the orthogonal sequence to the mobile station apparatus 200. The base station apparatus 100 transmits, as the first parameter and the second parameter, information indicating the number of cyclic shifts of the CAZAC sequence and information indicating the index of the orthogonal sequence, and thus the mobile station apparatus 200 can more flexibly specify the resource for transmitting the uplink control information.

For example, the base station apparatus 100 can specify, as the first region where the PUCCH can be utilized, the regions of up to number 3 of the cyclic shift of the CAZAC sequence. For example, the base station apparatus 100 can specify, as the first region where the PUCCH can be utilized, the regions of up to number 2 of the index of the orthogonal sequence. For example, the base station apparatus 100 can specify, as the first region where the PUCCH can be utilized, the regions of up to number 3 of the cyclic shift of the CAZAC sequence and of up to number 2 of the index of the orthogonal sequence.

Furthermore, the mobile station apparatus 200 can use, as the first transmission format, a transmission format in which the HARQ control information and the CQI can be transmitted together (simultaneously). In other words, the mobile station apparatus 200 can use the first transmission format to transmit the HARQ control information and the CQI together. For example, the mobile station apparatus 200 transmits the HARQ control information and the CQI together, the HARQ control information is for the PDCCH and/or the downlink transport block transmitted on the PDSCH on each of DCC1, DCC2 and DCC3. The mobile station apparatus 200 uses, as the first transmission format, the transmission format in which the HARQ control information and the CQI can be transmitted together, and thereby can use the PUCCH allocated by the base station apparatus 100 more efficiently to transmit the uplink control information (the HARQ control information and the CQI).

Moreover, the mobile station apparatus 200 can use, as the first transmission format, a transmission format in which the HARQ control information and the scheduling request can be transmitted together (simultaneously). In other words, the mobile station apparatus 200 can use the first transmission format to transmit the HARQ control information and the scheduling request. For example, the mobile station apparatus 200 transmits the HARQ control information and the scheduling request, the HARQ control information is for the PDCCH and/or the downlink transport block transmitted on the PDSCH on each of DCC1, DCC2 and DCC3. The mobile station apparatus 200 uses, as the first transmission format, the transmission format in which the HARQ control information and the scheduling request can be transmitted together, and thereby can use the PUCCH allocated by the base station apparatus 100 more efficiently to transmit the uplink control information (the HARQ control information and the scheduling request).

As described above, in the first embodiment, the base station apparatus 100 specifies the first region and the second region where the mobile station apparatus 200 can utilize the PUCCH, and the mobile station apparatus 200 uses the first region or the second region based on the PDCCH to which the base station apparatus 100 allocates (schedules) the PDSCH to transmit the HARQ control information. The base station apparatus 100 and the mobile station apparatus 200 transmit and receive, as described above, the HARQ control information, and thus can transmit and receive the HARQ control information while using the uplink resource efficiently.

For example, the mobile station apparatus 200 that communicates with the base station apparatus 100 using a plurality of component carriers uses the PUCCH in the first region specified by the base station apparatus 100 to transmit the HARQ control information for a plurality of PDCCHs and/or a plurality of downlink transport blocks, and thereby can transmit the HARQ control information while using the uplink resource efficiently.

In case that the base station apparatus 100 uses one PDCCH on the specific component carrier to allocate one PDSCH, the mobile station apparatus 200 uses the second region to transmit the HARQ control information, and thus it is possible to transmit and receive the HARQ control information at least on the specific component carrier between the base station apparatus 100 and the mobile station apparatus 200.

For example, in conditions in which the number of component carriers used for communication differs between the base station apparatus 100 and the mobile station apparatus 200 (for example, the base station apparatus 100 is determined to perform communication using five DCCs and the mobile station apparatus 200 is determined to perform communication using three DCCs), it is possible to transmit and receive the HARQ control information at least on the specific component carrier and thereby continue the communication between the base station apparatus 100 and the mobile station apparatus 200.

In the base station apparatus 100, the first parameter specifying the first region and the second parameter specifying the second region are transmitted to the mobile station apparatus 200, and thus it is possible to specify each of the regions based on the conditions within the managed cell (the number of mobile station apparatuses 200 performing communication using the downlink resource and the uplink resource and a plurality of component carriers, the number of mobile station apparatuses 200 performing communication using one component carrier and the like), with the result that it is possible to more flexibly control the transmission of the HARQ control information.

The mobile station apparatus 200 communicating with the base station apparatus 100 using a plurality of component carriers uses the first transmission format to transmit the HARQ control information for a plurality of PDCCHs and/or a plurality of downlink transport blocks, and thereby can control the transmission of the HARQ control information while using the uplink resource efficiently.

The mobile station apparatus 200 uses the first transmission format and the second transmission format to transmit the HARQ control information, and thus it is possible to more flexibly control the transmission of the HARQ control information in the base station apparatus 100. In other words, it is possible to control, with the base station apparatus 100, the transmission of the HARQ control information with consideration given to the amount of information on the HARQ control information transmitted by the mobile station apparatus 200, the number of mobile station apparatuses 200 transmitting the HARQ control information in a certain timing and the like.

Second Embodiment

A second embodiment of the present invention will now be described. In the second embodiment, the base station apparatus 100 transmits, to the mobile station apparatus 200, the first parameter specifying the first region where the mobile station apparatus 200 can utilize the PUCCH and transmits, to the mobile station apparatus 200, the second parameter specifying the second region that is different from the first region where the mobile station apparatus 200 can utilize the PUCCH; in case that the base station apparatus 100 uses a plurality of PDCCHs to allocate (schedule) a plurality of PDSCHs in the same sub-frame, the mobile station apparatus 200 uses the first region to transmit the HARQ control information to the base station apparatus 100 whereas, in case that the base station apparatus 100 uses one PDCCH to allocate (schedule) one PDSCH, the mobile station apparatus 200 uses the first region or the second region to transmit the HARQ control information to the base station apparatus 100.

The base station apparatus 100 transmits, to the mobile station apparatus 200, the first parameter specifying the first region where the mobile station apparatus 200 can utilize the PUCCH and transmits, to the mobile station apparatus 200, the second parameter specifying the second region that is different from the first region where the mobile station apparatus 200 can utilize the PUCCH; in case that the base station apparatus 100 uses one PDCCH on the specific component carrier to allocate (schedule) one PDSCH on a component carrier different from the component carrier where the PDCCH is mapped, the mobile station apparatus 200 uses the first region to transmit the HARQ control information to the base station apparatus 100 whereas, in case that the base station apparatus 100 uses one PDCCH on the specific component carrier to allocate (schedule) one PDSCH on the same component carrier as the component carrier where the PDCCH is mapped, the mobile station apparatus 200 uses the second region to transmit the HARQ control information to the base station apparatus 100.

The base station apparatus 100 transmits, to the mobile station apparatus 200, the first parameter specifying the first region where the mobile station apparatus 200 can utilize the PUCCH and transmits, to the mobile station apparatus 200, the second parameter specifying the second region that is different from the first region where the mobile station apparatus 200 can utilize the PUCCH; in case that the base station apparatus 100 uses a plurality of PDCCHs to allocate (schedule) a plurality of PDSCHs in the same sub-frame or in case that the base station apparatus 100 uses one PDCCH on the specific component carrier to allocate (schedule) one PDSCH on a component carrier different from the component carrier where the PDCCH is mapped, the mobile station apparatus 200 uses the first region to transmit the HARQ control information to the base station apparatus 100 whereas, in case that the base station apparatus 100 uses one PDCCH on the specific component carrier to allocate (schedule) one PDSCH on the same component carrier as the component carrier where the PDCCH is mapped, the mobile station apparatus 200 uses the second region to transmit the HARQ control information to the base station apparatus 100.

Furthermore, the base station apparatus 100 transmits, to the mobile station apparatus 200, the first parameter specifying the first region where the mobile station apparatus 200 can utilize the first transmission format, and transmits, to the mobile station apparatus 200, the second parameter specifying the second region in which the mobile station apparatus 200 can utilize the second transmission format and which is different from the first region; in case that the base station apparatus 100 uses a plurality of PDCCHs to allocate (schedule) a plurality of PDSCHs in the same sub-frame, the mobile station apparatus 200 uses the first transmission format to transmit the HARQ control information to the base station apparatus 100 whereas, in case that the base station apparatus 100 uses one PDCCH to allocate (schedule) one PDSCH, the mobile station apparatus 200 uses the first transmission format or the second transmission format to transmit the HARQ control information to the base station apparatus 100.

Moreover, the base station apparatus 100 transmits, to the mobile station apparatus 200, the first parameter specifying the first region where the mobile station apparatus 200 can utilize the first transmission format, and transmits, to the mobile station apparatus 200, the second parameter specifying the second region different from the first region where the mobile station apparatus 200 can utilize the first transmission format; in case that the base station apparatus 100 uses one PDCCH on the specific component carrier to allocate (schedule) one PDSCH on a component carrier different from the component carrier where the PDCCH is mapped, the mobile station apparatus 200 uses the first transmission format to transmit the HARQ control information to the base station apparatus 100 whereas, in case that the base station apparatus 100 uses one PDCCH on the specific component carrier to allocate (schedule) one PDSCH on the same component carrier as the component carrier where the PDCCH is mapped, the mobile station apparatus 200 uses the second transmission format to transmit the HARQ control information to the base station apparatus 100.

Moreover, the base station apparatus 100 transmits, to the mobile station apparatus 200, the first parameter specifying the first region where the mobile station apparatus 200 can utilize the first transmission format, and transmits, to the mobile station apparatus 200, the second parameter specifying the second region in which the mobile station apparatus 200 can utilize the second transmission format and which is different from the first region; in case that the base station apparatus 100 uses a plurality of PDCCHs to allocate (schedule) a plurality of PDSCHs in the same sub-frame or in case that the base station apparatus 100 uses one PDCCH on the specific component carrier to allocate (schedule) one PDSCH on a component carrier different from the component carrier where the PDCCH is mapped, the mobile station apparatus 200 uses the first transmission format to transmit the HARQ control information to the base station apparatus 100 whereas, in case that the base station apparatus 100 uses one PDCCH on the specific component carrier to allocate (schedule) one PDSCH on the same component carrier as the component carrier where the PDCCH is mapped, the mobile station apparatus 200 uses the second transmission format to transmit the HARQ control information to the base station apparatus 100.

Here, the HARQ control information transmitted from the mobile station apparatus 200 includes information indicating ACK/NACK and/or information indicating the DTX for the PDCCH and/or the downlink transport block transmitted from the base station apparatus 100. The information indicating the DTX is information which indicates that the mobile station apparatus 200 has failed to detect the PDCCH transmitted from the base station apparatus 100.

Since the first parameter and the second parameter transmitted from the base station apparatus 100 to the mobile station apparatus 200 are the same as those described in the first embodiment, their description will not be repeated.

As in the first embodiment, the second embodiment will be described with reference to FIG. 4. As in the first embodiment, the second embodiment can be applied to any of the symmetrically carrier-aggregated and asymmetrically carrier-aggregated mobile communication systems.

In FIG. 4, the mobile station apparatus 200 uses the PUCCH allocated by the base station apparatus 100 to transmit the HARQ control information to the base station apparatus 100.

Here, in case that the base station apparatus 100 uses a plurality of PDCCHs to allocate a plurality of PDSCHs in the same sub-frame, the mobile station apparatus 200 uses the first region to transmit the HARQ control information. Here, the mobile station apparatus 200 uses the region A (region A represented by RB1 and RB2) to transmit, for example, the CSI or the CQI to the base station apparatus 100.

For example, in FIG. 4, in case that the base station apparatus 100 uses the PDCCHs on each of DCC1, DCC2 and DCC3 to allocate three PDSCHs in the same sub-frame, the mobile station apparatus 200 uses the first region to transmit the HARQ control information. For example, in case that the base station apparatus 100 uses two PDCCHs on DCC2 to allocate two PDSCHs in the same sub-frame, the mobile station apparatus 200 uses the first region to transmit the HARQ control information.

In FIG. 4, in case that the base station apparatus 100 uses one PDCCH to allocate one PDSCH, the mobile station apparatus 200 uses the first region or the second region to transmit the HARQ control information.

Here, in case that the base station apparatus 100 uses one PDCCH on the specific component carrier to allocate one PDSCH on a component carrier different from the component carrier where the PDCCH is mapped, the mobile station apparatus 200 uses the first region to transmit the HARQ control information. In case that the base station apparatus 100 uses one PDCCH on the specific component carrier to allocate one PDSCH on the same component carrier as the component carrier where the PDCCH is mapped, the mobile station apparatus 200 uses the second region to transmit the HARQ control information.

As described in the first embodiment, the base station apparatus 100 can set the specific downlink component carrier for the mobile station apparatus 200. The base station apparatus 100 and the mobile station apparatus 200 can consider that the downlink component carrier corresponding to the uplink component carrier set, by the base station apparatus 100, as the uplink component carrier on which the HARQ control information is transmitted is the specific downlink component carrier. The base station apparatus 100 and the mobile station apparatus 200 can also consider that the downlink component carrier used for performing the initial connection establishment is the specific downlink component carrier.

For example, in FIG. 4, in case that the base station apparatus 100 uses the broadcast channel to set DCC2 as the specific downlink component carrier and uses one PDCCH on DCC2 to allocate one PDSCH on DCC1 or DCC3, the mobile station apparatus 200 uses the first region to transmit the HARQ control information. For example, in case that the base station apparatus 100 uses the RRC signaling to set DCC2 as the specific downlink component carrier and uses one PDCCH on DCC2 to allocate one PDSCH on DCC1 or DCC3, the mobile station apparatus 200 uses the first region to transmit the HARQ control information.

For example, in case that the base station apparatus 100 uses the broadcast channel to set DCC2 as the specific downlink component carrier and uses one PDCCH on DCC2 to allocate one PDSCH on DCC2, the mobile station apparatus 200 uses the second region to transmit the HARQ control information. For example, in case that the base station apparatus 100 uses the RRC signaling to set DCC2 as the specific downlink component carrier and uses one PDCCH on DCC2 to allocate one PDSCH on DCC2, the mobile station apparatus 200 uses the second region to transmit the HARQ control information.

Here, in case that the base station apparatus 100 uses a plurality of PDCCHs on the specific downlink component carrier to allocate a plurality of PDSCHs in the same sub-frame, the mobile station apparatus 200 uses the first region to transmit the HARQ control information.

In other words, the mobile station apparatus 200 uses the first region to transmit, to the base station apparatus 100, the HARQ control information for a plurality of PDCCHs and/or the downlink transport blocks transmitted on a plurality of PDSCHs. The mobile station apparatus 200 uses the first region to transmit, to the base station apparatus 100, the HARQ control information for one PDCCH on the specific component carrier and/or the downlink transport block transmitted on one PDSCH on a component carrier different from the component carrier where the PDCCH is mapped.

In other words, in case that the base station apparatus uses a plurality of PDCCHs to allocate a plurality of PDSCHs in the same sub-frame or in case that the base station apparatus uses one PDCCH on the specific component carrier to allocate one PDSCH on a component carrier different from the component carrier where the PDCCH is mapped, the mobile station apparatus 200 uses the first region to transmit the HARQ control information.

The mobile station apparatus 200 uses the second region to transmit, to the base station apparatus 100, the HARQ control information for one PDCCH on the specific component carrier and/or the downlink transport block transmitted on one PDSCH on the same component carrier as the component carrier where the PDCCH is mapped.

Here, as described in the first embodiment, the mobile station apparatus 200, in case of transmitting the HARQ control information by using the first region, uses the first transmission format to transmit the HARQ control information to the base station apparatus 100. The mobile station apparatus 200, in case of transmitting the HARQ control information by using the second region, uses the second transmission format to transmit the HARQ control information to the base station apparatus 100.

In other words, in case that the base station apparatus 100 uses a plurality of PDCCHs to allocate a plurality of PDSCHs in the same sub-frame, the mobile station apparatus 200 uses the first transmission format to transmit the HARQ control information. In case that the base station apparatus 100 uses one PDCCH to allocate one PDSCH, the mobile station apparatus 200 uses the first transmission format or the second transmission format to transmit the HARQ control information.

In case that the base station apparatus 100 uses one PDCCH on the specific component carrier to allocate one PDSCH on a component carrier different from the component carrier where the PDCCH is mapped, the mobile station apparatus 200 uses the first transmission format to transmit the HARQ control information. In other words, in case that the base station apparatus 100 uses a plurality of PDCCHs to allocate a plurality of PDSCHs in the same sub-frame or in case that the base station apparatus 100 uses one PDCCH on the specific component carrier to allocate one PDSCH on a component carrier different from the component carrier where the PDCCH is mapped, the mobile station apparatus 200 uses the first transmission format to transmit the HARQ control information.

In case that the base station apparatus 100 uses one PDCCH on the specific component carrier to allocate one PDSCH on the same component carrier as the component carrier where the PDCCH is mapped, the mobile station apparatus 200 uses the second transmission format to transmit the HARQ control information.

Here, since the first transmission format and the second transmission format are the same as those described in the first embodiment, their description will not be repeated.

As described above, in the second embodiment, the base station apparatus 100 specifies the first region and the second region where the mobile station apparatus 200 can utilize the PUCCH, and the mobile station apparatus 200 uses the first region or the second region based on the PDCCH to which the base station apparatus 100 allocates (schedules) the PDSCH to transmit the HARQ control information. The base station apparatus 100 and the mobile station apparatus 200 transmit and receive, as described above, the HARQ control information, and thus it is possible to transmit and receive the HARQ control information while using the uplink resource efficiently.

For example, the mobile station apparatus 200 that communicates with the base station apparatus 100 using a plurality of component carriers uses the PUCCH in the first region specified by the base station apparatus 100 to transmit the HARQ control information for a plurality of PDCCHs and/or a plurality of downlink transport blocks, and thus it is possible to transmit the HARQ control information while using the uplink resource efficiently.

In case that the base station apparatus 100 uses one PDCCH on the specific component carrier to allocate one PDSCH on the same component carrier as the component carrier where the PDCCH is mapped, the mobile station apparatus 200 uses the second region to transmit the HARQ control information, and thus it is possible to transmit and receive the HARQ control information at least on the specific component carrier between the base station apparatus 100 and the mobile station apparatus 200.

For example, in conditions in which the number of component carriers used for communication differs between the base station apparatus 100 and the mobile station apparatus 200 (for example, the base station apparatus 100 is determined to perform communication using five DCCs and the mobile station apparatus 200 is determined to perform communication using three DCCs), it is possible to transmit and receive the HARQ control information at least on the specific component carrier and thereby continue the communication between the base station apparatus 100 and the mobile station apparatus 200.

In the base station apparatus 100, the first parameter specifying the first region and the second parameter specifying the second region are transmitted to the mobile station apparatus, and thus it is possible to specify each of the regions according to the conditions within the managed cell (the number of mobile station apparatuses 200 performing communication using the downlink resource and the uplink resource and a plurality of component carriers, the number of mobile station apparatuses 200 performing communication using one component carrier and the like), with the result that it is possible to more flexibly control the transmission of the HARQ control information.

The mobile station apparatus 200 communicating with the base station apparatus 100 using a plurality of component carriers uses the first transmission format to transmit the HARQ control information for a plurality of PDCCHs and/or a plurality of downlink transport blocks, and thus it is possible to control the transmission of the HARQ control information while using the uplink resource efficiently.

The mobile station apparatus 200 uses the first transmission format and the second transmission format to transmit the HARQ control information, and thus it is possible to more flexibly control, by the base station apparatus 100, the transmission of the HARQ control information. In other words, it is possible to control, by the base station apparatus 100, the transmission of the HARQ control information with consideration given to the amount of information on the HARQ control information transmitted by the mobile station apparatus 200, the number of mobile station apparatuses 200 transmitting the HARQ control information in a certain timing and the like.

Third Embodiment

A third embodiment of the present invention will now be described. In the third embodiment, the base station apparatus 100 transmits, to the mobile station apparatus 200, the first parameter specifying the first region where the mobile station apparatus 200 can utilize the PUCCH and transmits, to the mobile station apparatus 200, a plurality of parameters specifying a plurality of regions that are different from the first region where the mobile station apparatus 200 can utilize the PUCCH; in case that the base station apparatus 100 uses a plurality of PDCCHs to allocate (schedule) a plurality of PDSCHs in the same sub-frame, the mobile station apparatus 200 uses the first region to transmit the HARQ control information to the base station apparatus 100 whereas, in case that the base station apparatus 100 uses one PDCCH to allocate (schedule) one PDSCH, the mobile station apparatus 200 uses either the first region or a plurality of regions to transmit the HARQ control information to the base station apparatus 100.

The base station apparatus 100 transmits, to the mobile station apparatus 200, the first parameter specifying the first region where the mobile station apparatus 200 can utilize the PUCCH and transmits, to the mobile station apparatus 200, a plurality of parameters specifying a plurality of regions that are different from the first region where the mobile station apparatus 200 can utilize the PUCCH; in case that the base station apparatus 100 uses one PDCCH to allocate one PDSCH on a component carrier different from the component carrier where the PDCCH is mapped, the mobile station apparatus 200 uses the first region to transmit the HARQ control information to the base station apparatus 100 whereas, in case that the base station apparatus 100 uses one PDCCH to allocate one PDSCH on the same component carrier as the component carrier where the PDCCH is mapped, the mobile station apparatus 200 uses any of the plurality of regions to transmit the HARQ control information to the base station apparatus 100.

The base station apparatus 100 transmits, to the mobile station apparatus 200, the first parameter specifying the first region where the mobile station apparatus 200 can utilize the PUCCH and transmits, to the mobile station apparatus 200, a plurality of parameters specifying a plurality of regions that are different from the first region where the mobile station apparatus 200 can utilize the PUCCH; in case that the base station apparatus 100 uses a plurality of PDCCHs to allocate (schedule) a plurality of PDSCHs in the same sub-frame or in case that the base station apparatus 100 uses one PDCCH to allocate one PDSCH on a component carrier different from the component carrier where the PDCCH is mapped, the mobile station apparatus 200 uses the first region to transmit the HARQ control information to the base station apparatus 100 whereas, in case that the base station apparatus 100 uses one PDCCH to allocate one PDSCH on the same component carrier as the component carrier where the PDCCH is mapped, the mobile station apparatus 200 uses any of the plurality of regions to transmit the HARQ control information to the base station apparatus 100.

Moreover, the base station apparatus 100 transmits, to the mobile station apparatus 200, the first parameter specifying the first region where the mobile station apparatus 200 can utilize the first transmission format, and transmits, to the mobile station apparatus 200, a plurality of parameters specifying a plurality of regions in which the mobile station apparatus 200 can utilize the second transmission format and which are different from the first region; in case that the base station apparatus 100 uses a plurality of PDCCHs to allocate (schedule) a plurality of PDSCHs in the same sub-frame, the mobile station apparatus 200 uses the first transmission format to transmit the HARQ control information to the base station apparatus 100 whereas, in case that the base station apparatus 100 uses one PDCCH to allocate (schedule) one PDSCH, the mobile station apparatus 200 uses the first transmission format or the second transmission format to transmit the HARQ control information to the base station apparatus 100.

Moreover, the base station apparatus 100 transmits, to the mobile station apparatus 200, the first parameter specifying the first region where the mobile station apparatus 200 can utilize the first transmission format, and transmits, to the mobile station apparatus 200, a plurality of parameters specifying a plurality of regions in which the mobile station apparatus 200 can utilize the second transmission format and which are different from the first region; in case that the base station apparatus 100 uses one PDCCH to allocate one PDSCH on a component carrier different from the component carrier where the PDCCH is mapped, the mobile station apparatus 200 uses the first transmission format to transmit the HARQ control information to the base station apparatus 100 whereas, in case that the base station apparatus 100 uses one PDCCH to allocate one PDSCH on the same component carrier as the component carrier where the PDCCH is mapped, the mobile station apparatus 200 uses the second transmission format to transmit the HARQ control information to the base station apparatus 100.

Moreover, the base station apparatus 100 transmits, to the mobile station apparatus 200, the first parameter specifying the first region where the mobile station apparatus 200 can utilize the first transmission format, and transmits, to the mobile station apparatus 200, a plurality of parameters specifying a plurality of regions in which the mobile station apparatus 200 can utilize the second transmission format and which are different from the first region; in case that the base station apparatus 100 uses a plurality of PDCCHs to allocate (schedule) a plurality of PDSCHs in the same sub-frame or in case that the base station apparatus 100 uses one PDCCH to allocate one PDSCH on a component carrier different from the component carrier where the PDCCH is mapped, the mobile station apparatus 200 uses the first transmission format to transmit the HARQ control information to the base station apparatus 100 whereas, in case that the base station apparatus 100 uses one PDCCH to allocate one PDSCH on the same component carrier as the component carrier where the PDCCH is mapped, the mobile station apparatus 200 uses the second transmission format to transmit the HARQ control information to the base station apparatus 100. Here, the HARQ control information transmitted from the mobile station apparatus 200 includes information indicating ACK/NACK and/or information indicating the DTX for the PDCCH and/or the downlink transport block transmitted from the base station apparatus 100. The information indicating the DTX is information which indicates that the mobile station apparatus 200 has failed to detect the PDCCH transmitted from the base station apparatus 100.

Figure 8:
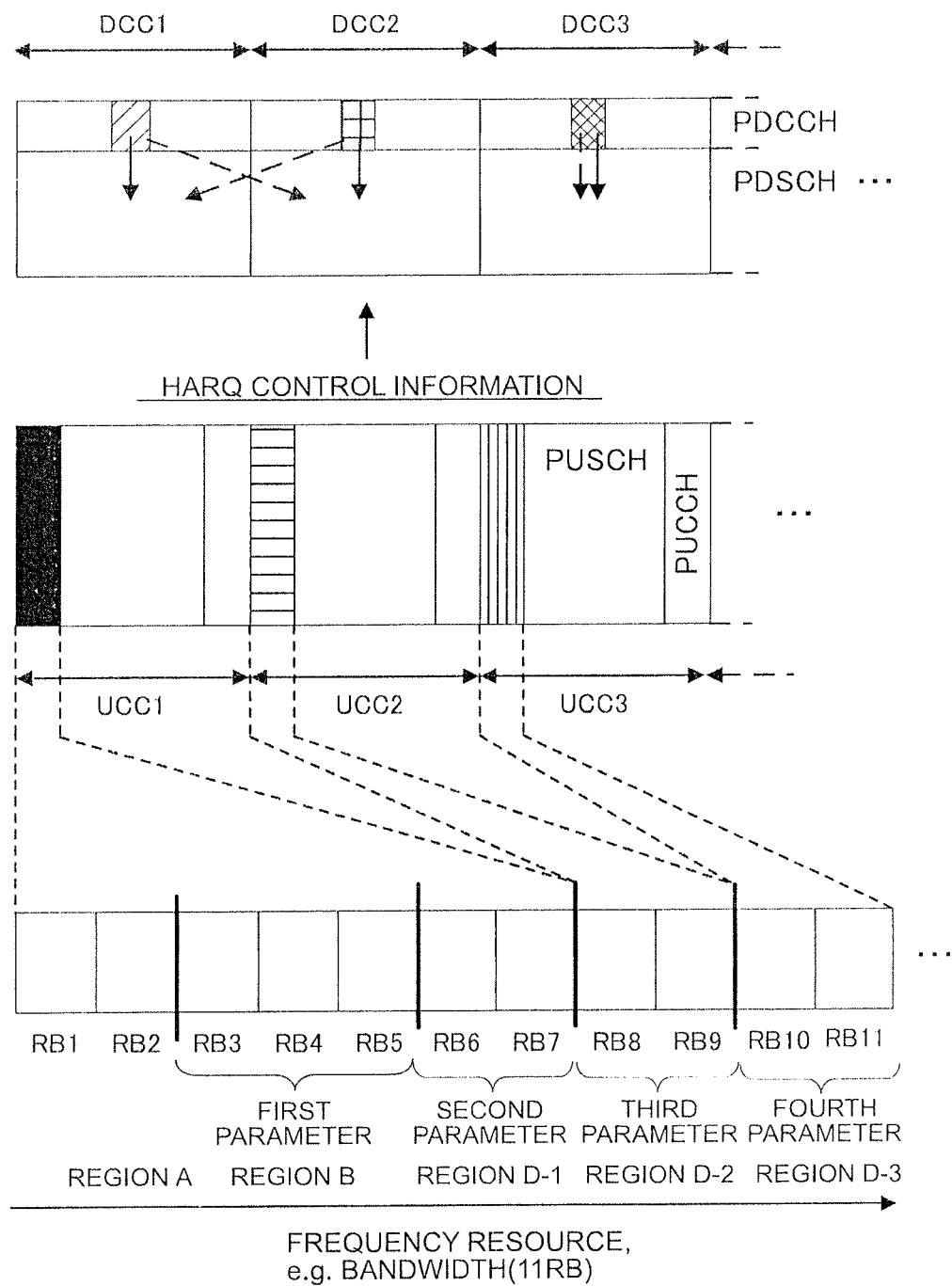
FIG. 8 is a diagram showing an example of a mobile communication system to which a third embodiment and a fourth embodiment can be applied.

FIG. 8 is a diagram showing an example of a mobile communication system to which the third embodiment can be applied. FIG. 8 shows an enlarged part of FIG. 9 and FIG. 10 for ease of illustration of the third embodiment. That is, the third embodiment can be applied to any of the symmetrically carrier-aggregated and asymmetrically carrier-aggregated mobile communication systems. In the following description, as an example, only component carriers in the enlarged part will be discussed; needless to say, the same embodiment can be applied to all the component carriers.

FIG. 8 shows, as an example of the description of the third embodiment, three downlink component carriers (DCC1, DCC2 and DCC3). FIG. 8 also shows three uplink component carriers (UCC1, DCC2 and UCC3). In FIG. 8, as described in the first embodiment, the base station apparatus 100 and the mobile station apparatus 200 perform downlink/uplink communication using the PDCCH, the PDSCH, the PUSCH, the PUCCH and the like.

In FIG. 8, regions that are extended with dotted lines from the PUCCH (PUCCH resource region indicated by a dotted pattern) on UCC1, the PUCCH (PUCCH resource region indicated by horizontal lines) on UCC2 and the PUCCH (PUCCH resource region indicated by vertical lines) on UCC3 conceptually show the PUCCHs on UCC1, UCC2 and UCC3. Here, for ease of description, the horizontal direction is assumed to be a frequency resource (which may be represented as a bandwidth), and the orthogonal resource described above is not discussed.

As described in the first embodiment, the base station apparatus 100 transmits the first parameter specifying the first region (region B indicated by RB3 to RB5) where the mobile station apparatus 200 can utilize the PUCCH. Likewise, the base station apparatus 100 transmits the second parameter specifying the second region (region D-1 indicated by RB6 and RB7) where the mobile station apparatus 200 can utilize the PUCCH. Likewise, the base station apparatus 100 transmits the third parameter specifying the third region (region D-2 indicated by RB8 and RB9) where the mobile station apparatus 200 can utilize the PUCCH. Likewise, the base station apparatus 100 transmits the fourth parameter specifying the fourth region (region D-3 indicated by RB10 and RB11) where the mobile station apparatus 200 can utilize the PUCCH.

Here, although, in FIG. 8, as an example, the base station apparatus 100 specifies up to the fourth region for the mobile station apparatus 200, the number of regions specified by the base station apparatus 100 varies according to the number of downlink component carriers used by the base station apparatus 100 and the mobile station apparatus 200 for communication.

As described in the first embodiment, the base station apparatus 100 can set the uplink component carrier on which the mobile station apparatus 200 transmits the HARQ control information. In FIG. 8, the base station apparatus 100 sets UCC1 as the uplink component carrier on which the mobile station apparatus 200 transmits the HARQ control information.

As described in the first embodiment, the base station apparatus 100 allocates, to the mobile station apparatus 200, the PUCCH on which the mobile station apparatus 200 transmits the HARQ control information. The mobile station apparatus 200 uses the PUCCH allocated by the base station apparatus 100 to transmit the HARQ control information to the base station apparatus 100.

Here, in FIG. 8, in case that the base station apparatus 100 uses a plurality of PDCCHs to allocate a plurality of PDSCHs in the same sub-frame, the mobile station apparatus 200 uses the first region to transmit the HARQ control information. Here, the mobile station apparatus 200 uses the region A (region A represented by RB1 and RB2) to transmit, for example, the CSI or the CQI to the base station apparatus 100.

For example, in FIG. 8, in case that the base station apparatus 100 uses the PDCCHs on each of DCC1, DCC2 and DCC3 to allocate three PDSCHs in the same sub-frame, the mobile station apparatus 200 uses the first region to transmit the HARQ control information. For example, in case that the base station apparatus 100 uses two PDCCHs on DCC2 to allocate two PDSCHs in the same sub-frame, the mobile station apparatus 200 uses the first region to transmit the HARQ control information.

In case that the base station apparatus 100 uses one PDCCH to allocate one PDSCH, the mobile station apparatus 200 uses the first region or a plurality of regions to transmit the HARQ control information.

Here, in case that the base station apparatus 100 uses one PDCCH to allocate one PDSCH on a component carrier different from the component carrier where the PDCCH is mapped, the mobile station apparatus 200 uses the first region to transmit the HARQ control information. In case that the base station apparatus 100 uses one PDCCH to allocate one PDSCH on the same component carrier as the component carrier where the PDCCH is mapped, the mobile station apparatus 200 uses any of a plurality of regions (the second region, the third region or the fourth region) to transmit the HARQ control information to the base station apparatus 100.

For example, in FIG. 8, in case that the base station apparatus 100 uses one PDCCH on DCC1 to allocate one PDSCH on DCC2 or DCC3, the mobile station apparatus 200 uses the first region to transmit the HARQ control information. For example, in case that the base station apparatus 100 uses one PDCCH on DCC2 to allocate one PDSCH on DCC1 or DCC3, the mobile station apparatus 200 uses the first region to transmit the HARQ control information. For example, in case that the base station apparatus 100 uses one PDCCH on DCC3 to allocate one PDSCH on DCC1 or DCC2, the mobile station apparatus 200 uses the first region to transmit the HARQ control information.

For example, in case that the base station apparatus 100 uses one PDCCH on DCC1 to allocate one PDSCH on DCC1, the mobile station apparatus 200 uses the second region (any of a plurality of regions) to transmit the HARQ control information. For example, in case that the base station apparatus 100 uses one PDCCH on DCC2 to allocate one PDSCH on DCC2, the mobile station apparatus 200 uses the third region (any of a plurality of regions) to transmit the HARQ control information. For example, in case that the base station apparatus 100 uses one PDCCH on DCC3 to allocate one PDSCH on DCC3, the mobile station apparatus 200 uses the fourth region (any of a plurality of regions) to transmit the HARQ control information.

Here, as described in the first embodiment, the base station apparatus 100 can associate the downlink component carrier with the uplink component carrier. In FIG. 8, the base station apparatus 100 associates DCC1 with UCC1, DCC2 with DCC2 and DCC3 with UCC3. In other words, the mobile station apparatus 200 transmits the HARQ control information to the base station apparatus 100 in the region of the PUCCH on the uplink component carrier corresponding to the downlink component carrier.

In other words, in FIG. 8, the mobile station apparatus 200 uses the region (second region) of the PUCCH on UCC1 corresponding to DCC1 to transmit the HARQ control information for the PDCCH and/or the downlink transport block transmitted on DCC1. The mobile station apparatus 200 uses the region (third region) of the PUCCH on DCC2 corresponding to DCC2 to transmit the HARQ control information for the PDCCH and/or the downlink transport block transmitted on DCC2. The mobile station apparatus 200 uses the region (fourth region) of the PUCCH on DCC3 corresponding to DCC3 to transmit the HARQ control information for the PDCCH and/or the downlink transport block transmitted on DCC3.

In other words, the mobile station apparatus 200 uses the first region to transmit, to the base station apparatus 100, the HARQ control information for a plurality of PDCCHs and/or the downlink transport blocks transmitted on a plurality of PDSCHs. The mobile station apparatus 200 uses the first region to transmit, to the base station apparatus 100, the HARQ control information for one PDCCH and/or the downlink transport block transmitted on one PDSCH on a component carrier different from the component carrier where one PDCCH is mapped.

In other words, in case that the base station apparatus 100 uses a plurality of PDCCHs to allocate a plurality of PDSCHs in the same sub-frame or in case that the base station apparatus 100 uses one PDCCH to allocate one PDSCH on a component carrier different from the component carrier where the PDCCH is mapped, the mobile station apparatus 200 uses the first region to transmit the HARQ control information.

The mobile station apparatus 200 uses any of a plurality of regions to transmit, to the base station apparatus 100, the HARQ control information for one PDCCH and/or the downlink transport block transmitted on one PDSCH on the same component carrier as the component carrier where one PDCCH is mapped.

Here, in FIG. 8, the mobile station apparatus 200, in case of transmitting the HARQ control information by using the first region, uses the first transmission format to transmit the HARQ control information to the base station apparatus 100. In case that the mobile station apparatus 200 uses any of a plurality of regions to transmit the HARQ control information, the mobile station apparatus 200 uses the second transmission format to transmit the HARQ control information to the base station apparatus 100.

In other words, in case that the base station apparatus 100 uses a plurality of PDCCHs to allocate a plurality of PDSCHs in the same sub-frame, the mobile station apparatus 200 uses the first transmission format to transmit the HARQ control information. In case that the base station apparatus 100 uses one PDCCH to allocate one PDSCH, the mobile station apparatus 200 uses the first transmission format or the second transmission format to transmit the HARQ control information.

In case that the base station apparatus 100 uses one PDCCH to allocate one PDSCH on a component carrier different from the component carrier where the PDCCH is mapped, the mobile station apparatus 200 uses the first transmission format to transmit the HARQ control information to the base station apparatus 100. In other words, in case that the base station apparatus 100 uses a plurality of PDCCHs to allocate a plurality of PDSCHs in the same sub-frame or in case that the base station apparatus 100 uses one PDCCH to allocate one PDSCH on a component carrier different from the component carrier where the PDCCH is mapped, the mobile station apparatus 200 uses the first transmission format to transmit the HARQ control information to the base station apparatus 100.

In case that the base station apparatus 100 uses one PDCCH to allocate one PDSCH on the same component carrier as the component carrier where the PDCCH is mapped, the mobile station apparatus 200 uses the second transmission format to transmit the HARQ control information to the base station apparatus 100.

Here, since the first transmission format and the second transmission format are the same as those described in the first embodiment, their description will not be repeated.

As described above, in the third embodiment, the base station apparatus 100 specifies the first region and a plurality of regions where the mobile station apparatus 200 can utilize the PUCCH, and the mobile station apparatus 200 uses either the first region or the plurality of regions based on the PDCCH to which the base station apparatus 100 allocates (schedules) the PDSCH to transmit the HARQ control information. The base station apparatus 100 and the mobile station apparatus 200 transmit and receive, as described above, the HARQ control information, and thus it is possible to transmit and receive the HARQ control information while using the uplink resource efficiently.

For example, the mobile station apparatus 200 that communicates with the base station apparatus 100 using a plurality of component carriers uses the PUCCH in the first region specified by the base station apparatus 100 to transmit the HARQ control information for a plurality of PDCCHs and/or a plurality of downlink transport blocks, and thus it is possible to transmit the HARQ control information while using the uplink resource efficiently.

In case that the base station apparatus 100 uses one PDCCH to allocate one PDSCH on the same component carrier as the component carrier where the PDCCH is mapped, the mobile station apparatus 200 uses any of a plurality of regions to transmit the HARQ control information, and thus it is possible to transmit and receive the HARQ control information at least on one component carrier (each of the component carriers) between the base station apparatus 100 and the mobile station apparatus 200.

For example, in conditions in which the number of component carriers used for communication differs between the base station apparatus 100 and the mobile station apparatus 200 (for example, the base station apparatus 100 is determined to perform communication using five DCCs and the mobile station apparatus 200 is determined to perform communication using three DCCs), it is possible to transmit and receive the HARQ control information at least on one component carrier (each of the component carriers) and thereby continue the communication between the base station apparatus 100 and the mobile station apparatus 200.

In the base station apparatus 100, the first parameter specifying the first region and a plurality of parameters specifying a plurality of regions are transmitted to the mobile station apparatus, and thus it is possible to specify each of the regions according to the conditions within the managed cell (the number of mobile station apparatuses 200 performing communication using the downlink resource and the uplink resource and a plurality of component carriers, the number of mobile station apparatuses 200 performing communication using one component carrier and the like), with the result that it is possible to more flexibly control the transmission of the HARQ control information.

The mobile station apparatus 200 communicating with the base station apparatus 100 using a plurality of component carriers transmits, with the first transmission format, the HARQ control information for a plurality of PDCCHs and/or a plurality of downlink transport blocks, and thus it is possible to control the transmission of the HARQ control information while using the uplink resource efficiently.

The mobile station apparatus 200 uses the first transmission format and the second transmission format to transmit the HARQ control information, and thus it is possible to more flexibly control, by the base station apparatus 100, the transmission of the HARQ control information. In other words, it is possible to control, by the base station apparatus 100, the transmission of the HARQ control information with consideration given to the amount of information on the HARQ control information transmitted by the mobile station apparatus 200, the number of mobile station apparatuses 200 transmitting the HARQ control information in a certain timing and the like.

Fourth Embodiment

A fourth embodiment of the present invention will now be described. In the fourth embodiment, the base station apparatus 100 transmits, to the mobile station apparatus 200, the first parameter specifying the first region where the mobile station apparatus 200 can utilize the PUCCH and transmits, to the mobile station apparatus 200, a plurality of parameters specifying a plurality of parameter that are different from the first region where the mobile station apparatus 200 can utilize the PUCCH; in case that the base station apparatus 100 uses a plurality of PDCCHs to allocate (schedule) a plurality of PDSCHs in the same sub-frame, the mobile station apparatus 200 uses the first region to transmit the HARQ control information to the base station apparatus 100 whereas, in case that the base station apparatus 100 uses one PDCCH to allocate (schedule) one PDSCH, the mobile station apparatus 200 uses either the first region or a plurality of regions to transmit the HARQ control information to the base station apparatus 100.

The base station apparatus 100 transmits, to the mobile station apparatus 200, the first parameter specifying the first region where the mobile station apparatus 200 can utilize the PUCCH and transmits, to the mobile station apparatus 200, a plurality of parameters specifying a plurality of regions that are different from the first region where the mobile station apparatus 200 can utilize the PUCCH; in case that the base station apparatus 100 uses one PDCCH carrying a component carrier indicator field to allocate one PDSCH, the mobile station apparatus 200 uses the first region to transmit the HARQ control information to the base station apparatus 100 whereas, in case that the base station apparatus 100 uses one PDCCH not carrying the component carrier indicator field to allocate (schedule) one PDSCH, the mobile station apparatus 200 uses any of a plurality of regions to transmit the HARQ control information to the base station apparatus 100.

The base station apparatus 100 transmits, to the mobile station apparatus 200, the first parameter specifying the first region where the mobile station apparatus 200 can utilize the PUCCH and transmits, to the mobile station apparatus 200, a plurality of parameters specifying a plurality of regions that are different from the first region where the mobile station apparatus 200 can utilize the PUCCH; in case that the base station apparatus 100 uses a plurality of PDCCHs to allocate (schedule) a plurality of PDSCHs in the same sub-frame or in case that the base station apparatus 100 uses one PDCCH carrying the component carrier indicator field to allocate (schedule) one PDSCH, the mobile station apparatus 200 uses the first region to transmit the HARQ control information to the base station apparatus 100 whereas, in case that the base station apparatus 100 uses one PDCCH not carrying the component carrier indicator field to allocate (schedule) one PDSCH, the mobile station apparatus 200 uses any of a plurality of regions to transmit the HARQ control information to the base station apparatus 100.

Moreover, the base station apparatus 100 transmits, to the mobile station apparatus 200, the first parameter specifying the first region where the mobile station apparatus 200 can utilize the first transmission format, and transmits, to the mobile station apparatus 200, a plurality of parameters specifying a plurality of regions in which the mobile station apparatus 200 can utilize the second transmission format and which are different from the first region; in case that the base station apparatus 100 uses a plurality of PDCCHs to allocate (schedule) a plurality of PDSCHs in the same sub-frame, the mobile station apparatus 200 uses the first transmission format to transmit the HARQ control information to the base station apparatus 100 whereas, in case that the base station apparatus 100 uses one PDCCH to allocate (schedule) one PDSCH, the mobile station apparatus 200 uses the first transmission format or the second transmission format to transmit the HARQ control information to the base station apparatus 100.

Moreover, the base station apparatus 100 transmits, to the mobile station apparatus 200, the first parameter specifying the first region where the mobile station apparatus 200 can utilize the first transmission format, and transmits, to the mobile station apparatus 200, a plurality of parameters specifying a plurality of regions in which the mobile station apparatus 200 can utilize the second transmission format and which are different from the first region; in case that the base station apparatus 100 uses one PDCCH carrying the component carrier indicator field to allocate (schedule) one PDSCH, the mobile station apparatus 200 uses the first transmission format to transmit the HARQ control information to the base station apparatus 100 whereas, in case that the base station apparatus 100 uses one PDCCH not carrying the component carrier indicator field to allocate (schedule) one PDSCH, the mobile station apparatus 200 uses the second transmission format to transmit the HARQ control information to the base station apparatus 100.

Moreover, the base station apparatus 100 transmits, to the mobile station apparatus 200, the first parameter specifying the first region where the mobile station apparatus 200 can utilize the first transmission format, and transmits, to the mobile station apparatus 200, a plurality of parameters specifying a plurality of regions in which the mobile station apparatus 200 can utilize the second transmission format and which are different from the first region; in case that the base station apparatus 100 uses a plurality of PDCCHs to allocate (schedule) a plurality of PDSCHs in the same sub-frame or in case that the base station apparatus 100 uses one PDCCH carrying the component carrier indicator field to allocate (schedule) one PDSCH, the mobile station apparatus 200 uses the first transmission format to transmit the HARQ control information to the base station apparatus 100 whereas, in case that the base station apparatus 100 uses one PDCCH not carrying the component carrier indicator field to allocate (schedule) one PDSCH, the mobile station apparatus 200 uses the second transmission format to transmit the HARQ control information to the base station apparatus 100.

Here, the HARQ control information transmitted from the mobile station apparatus 200 includes information indicating ACK/NACK and/or information indicating the DTX for the PDCCH and/or the downlink transport block transmitted from the base station apparatus 100. The information indicating the DTX is information which indicates that the mobile station apparatus 200 has failed to detect the PDCCH transmitted from the base station apparatus 100.

Since the first parameter and a plurality of parameters transmitted from the base station apparatus 100 to the mobile station apparatus 200 are the same as described in the third embodiment, their description will not be repeated.

As in the third embodiment, the fourth embodiment will be described with reference to FIG. 8. As in the third embodiment, the fourth embodiment can be applied to any of the symmetrically carrier-aggregated and asymmetrically carrier-aggregated mobile communication systems.

In FIG. 8, the mobile station apparatus 200 uses the PUCCH allocated by the base station apparatus 100, and transmits the HARQ control information to the base station apparatus 100.

Here, in case that the base station apparatus 100 uses a plurality of PDCCHs to allocate a plurality of PDSCHs in the same sub-frame, the mobile station apparatus 200 uses the first region to transmit the HARQ control information. Here, the mobile station apparatus 200 uses the region A (region A represented by RB1 and RB2), and transmits, for example, the CSI or the CQI to the base station apparatus 100.

For example, in FIG. 8, in case that the base station apparatus 100 uses the PDCCHs on each of DCC1, DCC2 and DCC3 to allocate three PDSCHs in the same sub-frame, the mobile station apparatus 200 uses the first region to transmit the HARQ control information. For example, in case that the base station apparatus 100 uses two PDCCHs on DCC2 to allocate two PDSCHs in the same sub-frame, the mobile station apparatus 200 uses the first region to transmit the HARQ control information.

In case that the base station apparatus 100 uses one PDCCH to allocate one PDSCH, the mobile station apparatus 200 uses either the first region or a plurality of regions to transmit the HARQ control information.

In case that the base station apparatus 100 uses one PDCCH carrying the component carrier indicator field to allocate one PDSCH, the mobile station apparatus 200 uses the first region to transmit the HARQ control information to the base station apparatus 100. In case that the base station apparatus 100 uses one PDCCH not carrying the component carrier indicator field to allocate one PDSCH, the mobile station apparatus 200 uses any of a plurality of regions (the second region, the third region or the fourth region) to transmit the HARQ control information.

As described above, the base station apparatus 100 transmits the component carrier indicator field on the PDCCH, and can thereby allocate, to the mobile station apparatus 200, the PDSCH on the same component carrier as or a different component carrier from the component carrier where the PDCCH is mapped. The base station apparatus 100 can set, for each of the component carriers, in each of the mobile station apparatuses 200, information indicating whether or not the component carrier indicator field is transmitted on the PDCCH.

For example, in FIG. 8, in case that the base station apparatus 100 uses one PDCCH carrying the component carrier indicator field on DCC1 to allocate one PDSCH, the mobile station apparatus 200 uses the first region to transmit the HARQ control information. For example, in case that the base station apparatus 100 uses one PDCCH carrying the component carrier indicator field on DCC2 to allocate one PDSCH, the mobile station apparatus 200 uses the first region to transmit the HARQ control information. For example, in case that the base station apparatus 100 uses one PDCCH carrying the component carrier indicator field on DCC3 to allocate one PDSCH, the mobile station apparatus 200 uses the first region to transmit the HARQ control information.

For example, in case that the base station apparatus 100 uses one PDCCH not carrying the component carrier indicator field on DCC1 to allocate one PDSCH on DCC1, the mobile station apparatus 200 uses the second region (any of a plurality of regions) to transmit the HARQ control information. For example, in case that the base station apparatus 100 uses one PDCCH not carrying the component carrier indicator field on DCC2 to allocate one PDSCH on DCC2, the mobile station apparatus 200 uses the third region (any of a plurality of regions) to transmit the HARQ control information. For example, in case that the base station apparatus 100 uses one PDCCH not carrying the component carrier indicator field on DCC3 to allocate one PDSCH on DCC3, the mobile station apparatus 200 uses the fourth region (any of a plurality of regions) to transmit the HARQ control information.

Here, the base station apparatus 100 cannot allocate, with one PDCCH not carrying the component carrier indicator field, one PDSCH on a component carrier different from the component carrier where the PDCCH is mapped.

Here, as described in the first embodiment, the base station apparatus 100 can associate the downlink component carrier with the uplink component carrier. In FIG. 8, the base station apparatus 100 associates DCC1 with UCC1, DCC2 with UCC2 and DCC3 with DCC3. In other words, the mobile station apparatus 200 transmits the HARQ control information to the base station apparatus 100 in the region of the PUCCH on the uplink component carrier corresponding to the downlink component carrier.

In other words, the mobile station apparatus 200 uses the first region, and transmits, to the base station apparatus 100, the HARQ control information for a plurality of PDSCHs and/or the downlink transport blocks transmitted on a plurality of PDCCHs. The mobile station apparatus 200 uses the first region, and transmits, to the base station apparatus 100, the HARQ control information for one PDCCH carrying the component carrier indicator field and/or the downlink transport block transmitted on one PDSCH.

In other words, in case that the base station apparatus 100 uses a plurality of PDCCHs to allocate a plurality of PDSCHs in the same sub-frame or in case that the base station apparatus 100 uses one PDCCH carrying the component carrier indicator field to allocate one PDSCH, the mobile station apparatus 200 uses the first region to transmit the HARQ control information.

The mobile station apparatus 200 uses any of a plurality of regions, and transmits, to the base station apparatus 100, the HARQ control information for one PDCCH not carrying the component carrier indicator field and/or the downlink transport block transmitted on one PDSCH.

Here, in FIG. 8, in case that the mobile station apparatus 200 uses the first region to transmit the HARQ control information, the mobile station apparatus 200 uses the first transmission format to transmit the HARQ control information to the base station apparatus 100. In case that the mobile station apparatus 200 uses any of a plurality of regions to transmit the HARQ control information, the mobile station apparatus 200 uses the second transmission format to transmit the HARQ control information to the base station apparatus 100.

In other words, in case that the base station apparatus 100 uses a plurality of PDCCHs to allocate a plurality of PDSCHs in the same sub-frame, the mobile station apparatus 200 uses the first transmission format to transmit the HARQ control information. In case that the base station apparatus 100 uses one PDCCH to allocate one PDSCH, the mobile station apparatus 200 uses the first transmission format or the second transmission format to transmit the HARQ control information.

In case that the base station apparatus 100 uses one PDCCH carrying the component carrier indicator field to allocate one PDSCH, the mobile station apparatus 200 uses the first transmission format to transmit the HARQ control information to the base station apparatus 100. In other words, in case that the base station apparatus 100 uses a plurality of PDCCHs to allocate a plurality of PDSCHs in the same sub-frame or in case that the base station apparatus 100 uses one PDCCH carrying the component carrier indicator field to allocate one PDSCH, the mobile station apparatus 200 uses the first transmission format to transmit the HARQ control information to the base station apparatus 100.

In case that the base station apparatus 100 uses one PDCCH not carrying the component carrier indicator field to allocate one PDSCH, the mobile station apparatus 200 uses the second transmission format to transmit the HARQ control information to the base station apparatus 100.

Here, since the first transmission format and the second transmission format are the same as those described in the first embodiment, their description will not be repeated.

As described above, in the fourth embodiment, the base station apparatus 100 specifies the first region and a plurality of regions where the mobile station apparatus 200 can utilize the PUCCH, and the mobile station apparatus 200 uses either the first region or a plurality of regions based on the PDCCH to which the base station apparatus 100 allocates (schedules) the PDSCH, and transmits the HARQ control information. The base station apparatus 100 and the mobile station apparatus 200 transmit and receive, as described above, the HARQ control information, and thus it is possible to transmit and receive the HARQ control information while using the uplink resource efficiently.

For example, the mobile station apparatus 200 that communicates with the base station apparatus 100 using a plurality of component carriers uses the PUCCH in the first region specified by the base station apparatus 100 and thereby transmits the HARQ control information for a plurality of PDCCHs and/or a plurality of downlink transport blocks, and thus it is possible to transmit the HARQ control information while using the uplink resource efficiently.

In case that the base station apparatus 100 uses one PDCCH not carrying the component carrier indicator field to allocate one PDSCH, the mobile station apparatus 200 uses any of a plurality of regions to transmit the HARQ control information, and thus it is possible to transmit and receive the HARQ control information, in the component carrier where the PDCCH not carrying the component carrier indicator field is transmitted, between the base station apparatus 100 and the mobile station apparatus 200.

For example, in conditions in which the number of component carriers used for communication differs between the base station apparatus 100 and the mobile station apparatus 200 (for example, the base station apparatus 100 is determined to perform communication using five DCCs and the mobile station apparatus 200 is determined to perform communication using three DCCs), it is possible to transmit and receive the HARQ control information in the component carrier where the PDCCH not carrying the component carrier indicator field is transmitted, and thereby continue the communication between the base station apparatus 100 and the mobile station apparatus 200.

In the base station apparatus 100, the first parameter specifying the first region and a plurality of parameters specifying a plurality of regions are transmitted to the mobile station apparatus, and thus it is possible to specify each of the regions according to the conditions within the managed cell (the number of mobile station apparatuses 200 performing communication using the downlink resource and the uplink resource and a plurality of component carriers, the number of mobile station apparatuses 200 performing communication using one component carrier and the like), with the result that it is possible to more flexibly control the transmission of the HARQ control information.

The mobile station apparatus 200 communicating with the base station apparatus 100 using a plurality of component carriers transmits, with the first transmission format, the HARQ control information for a plurality of PDCCHs and/or a plurality of downlink transport blocks, and thus it is possible to control the transmission of the HARQ control information while using the uplink resource efficiently.

The mobile station apparatus 200 uses the first transmission format and the second transmission format to transmit the HARQ control information, and thus it is possible to more flexibly control, by the base station apparatus 100, the transmission of the HARQ control information. In other words, it is possible to control, by the base station apparatus 100, the transmission of the HARQ control information with consideration given to the amount of information on the HARQ control information transmitted by the mobile station apparatus 200, the number of mobile station apparatuses 200 transmitting the HARQ control information in a certain timing and the like.

As, described above, the mobile communication system of the present invention is a mobile communication system in which the base station apparatus and mobile station apparatus use a plurality of component carriers to communicate with each other, and in which the base station apparatus transmits, to the mobile station apparatus, the first parameter specifying the first region where the mobile station apparatus can utilize the physical uplink control channel and transmits, to the mobile station apparatus, the second parameter specifying the second region in which the mobile station apparatus can utilize the physical uplink control channel and which is different from the first region; in case that the base station apparatus uses a plurality of physical downlink control channels to allocate a plurality of physical downlink shared channels in the same sub-frame, the mobile station apparatus uses the first region to transmit the HARQ control information to the base station apparatus whereas, in case that the base station apparatus uses one physical downlink control channel to allocate one physical downlink shared channel, the mobile station apparatus uses the first region or the second region to transmit the HARQ control information to the base station apparatus.

The mobile communication system of the present invention is also a mobile communication system in which the base station apparatus and mobile station apparatus use a plurality of component carriers to communicate with each other, and in which the base station apparatus transmits, to the mobile station apparatus, the first parameter specifying the first region where the mobile station apparatus can utilize the physical uplink control channel and transmits, to the mobile station apparatus, the second parameter specifying the second region in which the mobile station apparatus can utilize the physical uplink control channel and which is different from the first region; in case that the base station apparatus uses one physical downlink control channel on a component carrier other than a specific component carrier to allocate one physical downlink shared channel, the mobile station apparatus uses the first region to transmit the HARQ control information to the base station apparatus whereas, in case that the base station apparatus uses one physical downlink control channel on a component carrier other than the specific component carrier to allocate one physical downlink shared channel, the mobile station apparatus uses the second region to transmit the HARQ control information to the base station apparatus.

The mobile communication system of the present invention is also a mobile communication system in which the base station apparatus and mobile station apparatus use a plurality of component carriers to communicate with each other, and in which the base station apparatus transmits, to the mobile station apparatus, the first parameter specifying the first region where the mobile station apparatus can utilize the physical uplink control channel and transmits, to the mobile station apparatus, the second parameter specifying the second region in which the mobile station apparatus can utilize the physical uplink control channel and which is different from the first region; in case that the base station apparatus uses a plurality of physical downlink control channels to allocate a plurality of physical downlink shared channels in the same sub-frame or in case that the base station apparatus uses one physical downlink control channel on a component carrier other than the specific component carrier to allocate one physical downlink shared channel, the mobile station apparatus uses the first region to transmit the HARQ control information to the base station apparatus whereas, in case that the base station apparatus uses one physical downlink control channel on a component carrier other than the specific component carrier to allocate one physical downlink shared channel, the mobile station apparatus uses the second region to transmit the HARQ control information to the base station apparatus.

The mobile communication system of the present invention is also a mobile communication system in which the base station apparatus and mobile station apparatus use a plurality of component carriers to communicate with each other, and in which the base station apparatus transmits, to the mobile station apparatus, the first parameter specifying the first region where the mobile station apparatus can utilize the physical uplink control channel and transmits, to the mobile station apparatus, the second parameter specifying the second region in which the mobile station apparatus can utilize the physical uplink control channel and which is different from the first region; in case that the base station apparatus uses one physical downlink control channel on the specific component carrier to allocate one physical downlink shared channel on a component carrier different from the component carrier where the physical downlink control channel is mapped, the mobile station apparatus uses the first region to transmit the HARQ control information to the base station apparatus whereas, in case that the base station apparatus uses one physical downlink control channel on the specific component carrier to allocate one physical downlink shared channel on the same component carrier as the component carrier where the physical downlink control channel is mapped, the mobile station apparatus uses the second region to transmit the HARQ control information to the base station apparatus.

The mobile communication system of the present invention is also a mobile communication system in which the base station apparatus and mobile station apparatus use a plurality of component carriers to communicate with each other, and in which the base station apparatus transmits, to the mobile station apparatus, the first parameter specifying the first region where the mobile station apparatus can utilize the physical uplink control channel and transmits, to the mobile station apparatus, the second parameter specifying the second region in which the mobile station apparatus can utilize the physical uplink control channel and which is different from the first region; in case that the base station apparatus uses a plurality of physical downlink control channels to allocate a plurality of physical downlink shared channels in the same sub-frame or in case that the base station apparatus uses one physical downlink control channel on the specific component carrier to allocate one physical downlink shared channel on a component carrier different from the component carrier where the physical downlink control channel is mapped, the mobile station apparatus uses the first region to transmit the HARQ control information to the base station apparatus whereas, in case that the base station apparatus uses one physical downlink control channel on the specific component carrier to allocate one physical downlink shared channel on the same component carrier as the component carrier where the physical downlink control channel is mapped, the mobile station apparatus uses the second region to transmit the HARQ control information to the base station apparatus.

The mobile communication system uses, in the first region, the first transmission format to transmit the HARQ control information to the base station apparatus, and uses, in the second region, the second transmission format to transmit the HARQ control information to the base station apparatus; the first transmission format and the second transmission format are different from each other.

The mobile communication system of the present invention is also a mobile communication system in which the base station apparatus and mobile station apparatus use a plurality of component carriers to communicate with each other, and in which the base station apparatus transmits, to the mobile station apparatus, the first parameter specifying the first region where the mobile station apparatus can utilize the physical uplink control channel and transmits, to the mobile station apparatus, a plurality of parameters specifying a plurality of regions in which the mobile station apparatus can utilize the physical uplink control channel and which is different from the first region; in case that the base station apparatus uses a plurality of physical downlink control channels to allocate a plurality of physical downlink shared channels in the same sub-frame, the mobile station apparatus uses the first region to transmit the HARQ control information to the base station apparatus whereas, in case that the base station apparatus uses one physical downlink control channel to allocate one physical downlink shared channel, the mobile station apparatus uses either the first region or a plurality of regions to transmit the HARQ control information to the base station apparatus.

The mobile communication system of the present invention is also a mobile communication system in which the base station apparatus and mobile station apparatus use a plurality of component carriers to communicate with each other, and in which the base station apparatus transmits, to the mobile station apparatus, the first parameter specifying the first region where the mobile station apparatus can utilize the physical uplink control channel and transmits, to the mobile station apparatus, a plurality of parameters specifying a plurality of regions in which the mobile station apparatus can utilize the physical uplink control channel and which is different from the first region; in case that the base station apparatus uses one physical downlink control channel to allocate one physical downlink shared channel on a component carrier different from the component carrier where the physical downlink control channel is mapped, the mobile station apparatus uses the first region to transmit the HARQ control information to the base station apparatus whereas, in case that the base station apparatus uses one physical downlink control channel to allocate one physical downlink shared channel on a component carrier different from the component carrier where the physical downlink control channel is mapped, the mobile station apparatus uses a plurality of regions to transmit the HARQ control information to the base station apparatus.

The mobile communication system of the present invention is also a mobile communication system in which the base station apparatus and mobile station apparatus use a plurality of component carriers to communicate with each other, and in which the base station apparatus transmits, to the mobile station apparatus, the first parameter specifying the first region where the mobile station apparatus can utilize the physical uplink control channel and transmits, to the mobile station apparatus, a plurality of parameters specifying a plurality of regions in which the mobile station apparatus can utilize the physical uplink control channel and which is different from the first region; in case that the base station apparatus uses a plurality of physical downlink control channels to allocate a plurality of physical downlink shared channels in the same sub-frame or in case that the base station apparatus uses one physical downlink control channel to allocate one physical downlink shared channel on a component carrier different from the component carrier where the physical downlink control channel is mapped, the mobile station apparatus uses the first region to transmit the HARQ control information to the base station apparatus whereas, in case that the base station apparatus uses one physical downlink control channel to allocate one physical downlink shared channel on a component carrier different from the component carrier where the physical downlink control channel is mapped, the mobile station apparatus uses any of a plurality of regions to transmit the HARQ control information to the base station apparatus.

The mobile communication system of the present invention is also a mobile communication system in which the base station apparatus and mobile station apparatus use a plurality of component carriers to communicate with each other, and in which the base station apparatus transmits, to the mobile station apparatus, the first parameter specifying the first region where the mobile station apparatus can utilize the physical uplink control channel and transmits, to the mobile station apparatus, a plurality of parameters specifying a plurality of regions in which the mobile station apparatus can utilize the physical uplink control channel and which is different from the first region; in case that the base station apparatus uses one physical downlink control channel carrying the component carrier indicator field to allocate one physical downlink shared channel, the mobile station apparatus uses the first region to transmit the HARQ control information to the base station apparatus whereas, in case that the base station apparatus uses one physical downlink control channel not carrying the component carrier indicator field to allocate one physical downlink shared channel, the mobile station apparatus uses any of a plurality of regions to transmit the HARQ control information to the base station apparatus.

The mobile communication system of the present invention is also a mobile communication system in which the base station apparatus and mobile station apparatus use a plurality of component carriers to communicate with each other, and in which the base station apparatus transmits, to the mobile station apparatus, the first parameter specifying the first region where the mobile station apparatus can utilize the physical uplink control channel and transmits, to the mobile station apparatus, a plurality of parameters specifying a plurality of regions in which the mobile station apparatus can utilize the physical uplink control channel and which is different from the first region; in case that the base station apparatus uses a plurality of physical downlink control channels to allocate a plurality of physical downlink shared channels in the same sub-frame or in case that the base station apparatus uses one physical downlink control channel carrying the component carrier indicator field to allocate one physical downlink shared channel, the mobile station apparatus uses the first region to transmit the HARQ control information to the base station apparatus whereas, in case that the base station apparatus uses one physical downlink control channel not carrying the component carrier indicator field to allocate one physical downlink shared channel, the mobile station apparatus uses any of a plurality of regions to transmit the HARQ control information to the base station apparatus.

The mobile communication system uses, in the first region, the first transmission format to transmit the HARQ control information to the base station apparatus, and uses, in any of a plurality of regions, the second transmission format to transmit the HARQ control information to the base station apparatus; the first transmission format and the second transmission format are different from each other.

The HARQ control information includes information which indicates ACK or NACK for the downlink transport block transmitted on the physical downlink shared channel.

The HARQ control information includes information which indicates that the mobile station apparatus has failed to detect the physical downlink control channel.

The base station apparatus in the mobile communication system in which the base station apparatus and the mobile station apparatus use a plurality of component carriers to communicate with each other transmits, to the mobile station apparatus, the first parameter specifying the first region where the physical uplink control channel can be utilized and transmits, to the mobile station apparatus, the second parameter specifying the second region in which the physical uplink control channel can be utilized and which is different from the first region; in case that the base station apparatus uses a plurality of physical downlink control channels to allocate a plurality of physical downlink shared channels in the same sub-frame to the mobile station apparatus, the base station apparatus uses the first region to receive the HARQ control information from the mobile station apparatus whereas, in case that the base station apparatus uses one physical downlink control channel to allocate one physical downlink shared channel to the mobile station apparatus, the base station apparatus uses the first region or the second region to receive the HARQ control information from the mobile station apparatus.

The base station apparatus in the mobile communication system in which the base station apparatus and the mobile station apparatus use a plurality of component carriers to communicate with each other transmits, to the mobile station apparatus, the first parameter specifying the first region where the physical uplink control channel can be utilized and transmits, to the mobile station apparatus, the second parameter specifying the second region in which the physical uplink control channel can be utilized and which is different from the first region; in case that the base station apparatus uses one physical downlink control channel on a component carrier other than the specific component carrier to allocate one physical downlink shared channel to the mobile station apparatus, the base station apparatus uses the first region to receive the HARQ control information from the mobile station apparatus whereas, in case that the base station apparatus uses one physical downlink control channel on the specific component carrier to allocate one physical downlink shared channel to the mobile station apparatus, the base station apparatus uses the second region to receive the HARQ control information from the mobile station apparatus.

The base station apparatus in the mobile communication system in which the base station apparatus and the mobile station apparatus use a plurality of component carriers to communicate with each other transmits, to the mobile station apparatus, the first parameter specifying the first region where the physical uplink control channel can be utilized and transmits, to the mobile station apparatus, the second parameter specifying the second region in which the physical uplink control channel can be utilized and which is different from the first region; in case that the base station apparatus uses a plurality of physical downlink control channels to allocate a plurality of physical downlink shared channels in the sub-frame to the mobile station apparatus or in case that the base station apparatus uses one physical downlink control channel on a component carrier other than the specific component carrier to allocate one physical downlink shared channel to the mobile station apparatus, the base station apparatus uses the first region to receive the HARQ control information from the mobile station apparatus whereas, in case that the base station apparatus uses one physical downlink control channel on the specific component carrier to allocate one physical downlink shared channel to the mobile station apparatus, the base station apparatus uses the second region to receive the HARQ control information from the mobile station apparatus.

The mobile station apparatus in the mobile communication system in which the base station apparatus and the mobile station apparatus use a plurality of component carriers to communicate with each other receives, from the base station apparatus, the first parameter specifying the first region where the physical uplink control channel can be utilized and receives, from the base station apparatus, the second parameter specifying the second region in which the physical uplink control channel can be utilized and which is different from the first region; in case that the base station apparatus uses a plurality of physical downlink control channels to allocate a plurality of physical downlink shared channels in the same sub-frame, the mobile station apparatus uses the first region to transmit the HARQ control information to the base station apparatus whereas, in case that the base station apparatus uses one physical downlink control channel to allocate one physical downlink shared channel, the mobile station apparatus uses the first region or the second region to transmit the HARQ control information to the base station apparatus.

The mobile station apparatus in the mobile communication system in which the base station apparatus and the mobile station apparatus use a plurality of component carriers to communicate with each other receives, from the base station apparatus, the first parameter specifying the first region where the physical uplink control channel can be utilized and receives, from the base station apparatus, the second parameter specifying the second region in which the mobile station apparatus can utilize the physical uplink control channel and which is different from the first region; in case that the base station apparatus uses one physical downlink control channel on a component carrier other than the specific component carrier to allocate one physical downlink shared channel, the mobile station apparatus uses the first region to transmit the HARQ control information to the base station apparatus whereas, in case that the base station apparatus uses one physical downlink control channel on the specific component carrier to allocate one physical downlink shared channel, the mobile station apparatus uses the second region to transmit the HARQ control information to the base station apparatus.

The mobile station apparatus in the mobile communication system in which the base station apparatus and the mobile station apparatus use a plurality of component carriers to communicate with each other receives, from the base station apparatus, the first parameter specifying the first region where a physical uplink control channel can be utilized and receives, from the base station apparatus, the second parameter specifying the second region which is different from the first region in which the mobile station apparatus can utilize the physical uplink control channel; in case that the base station apparatus uses a plurality of physical downlink control channels to allocate a plurality of physical downlink shared channels in the same sub-frame or in case that the base station apparatus uses one of the physical downlink control channels on a component carrier other than the specific component carrier to allocate one of the physical downlink shared channels, the mobile station apparatus uses the first region to transmit the HARQ control information to the base station apparatus whereas, in case that the base station apparatus uses one physical downlink control channel on the specific component carrier to allocate one physical downlink shared channel, the mobile station apparatus uses the second region to transmit the HARQ control information to the base station apparatus.

In a communication method of the base station apparatus in which the base station apparatus and the mobile station apparatus use a plurality of component carriers to communicate with each other, the base station apparatus transmits, to the mobile station apparatus, the first parameter specifying the first region where the physical uplink control channel can be utilized, and transmits, to the mobile station apparatus, the second parameter specifying the second region in which the physical uplink control channel can be utilized and which is different from the first region; in case that the base station apparatus uses a plurality of physical downlink control channels to allocate a plurality of physical downlink shared channels in the same sub-frame to the mobile station apparatus, the base station apparatus uses the first region to receive the HARQ control information from the mobile station apparatus whereas, in case that the base station apparatus uses one of the physical downlink control channels to allocate one of the physical downlink shared channels to the mobile station apparatus, the base station apparatus uses the first region or the second region to receive the HARQ control information from the mobile station apparatus.

In a communication method of the base station apparatus in which the base station apparatus and the mobile station apparatus use a plurality of component carriers to communicate with each other, the base station apparatus transmits, to the mobile station apparatus, the first parameter specifying the first region where the physical uplink control channel can be utilized, and transmits, to the mobile station apparatus, the second parameter specifying the second region in which the physical uplink control channel can be utilized and which is different from the first region; in case that the base station apparatus uses one physical downlink control channel on a component carrier other than the specific component carrier to allocate one physical downlink shared channel to the mobile station apparatus, the base station apparatus uses the first region to receive the HARQ control information from the mobile station apparatus whereas, in case that the base station apparatus uses one of the physical downlink control channels on the specific component carrier to allocate one of the physical downlink shared channels to the mobile station apparatus, the base station apparatus uses the second region to receive the HARQ control information from the mobile station apparatus.

In a communication method of the base station apparatus in which the base station apparatus and the mobile station apparatus use a plurality of component carriers to communicate with each other, the base station apparatus transmits, to the mobile station apparatus, the first parameter specifying the first region where the physical uplink control channel can be utilized, and transmits, to the mobile station apparatus, the second parameter specifying the second region in which the physical uplink control channel can be utilized and which is different from the first region; in case that the base station apparatus uses a plurality of physical downlink control channels to allocate a plurality of physical downlink shared channels in the same sub-frame to the mobile station apparatus or in case that the base station apparatus uses one physical downlink control channel on a component carrier other than the specific component carrier to allocate one physical downlink shared channel to the mobile station apparatus, the base station apparatus uses the first region to receive the HARQ control information from the mobile station apparatus whereas, in case that the base station apparatus uses one physical downlink control channel on the specific component carrier to allocate one physical downlink shared channel to the mobile station apparatus, the base station apparatus uses the second region to receive the HARQ control information from the mobile station apparatus.

In a communication method of the mobile station apparatus in which the base station apparatus and the mobile station apparatus use a plurality of component carriers to communicate with each other, the mobile station apparatus receives, from the base station apparatus, the first parameter specifying the first region where the physical uplink control channel can be utilized, and receives, from the base station apparatus, the second parameter specifying the second region in which the physical uplink control channel can be utilized and which is different from the first region; in case that the base station apparatus uses a plurality of physical downlink control channels to allocate a plurality of physical downlink shared channels in the same sub-frame, the mobile station apparatus uses the first region to transmit the HARQ control information to the base station apparatus whereas, in case that the base station apparatus uses one physical downlink control channel to allocate one physical downlink shared channel, the mobile station apparatus uses the first region or the second region to transmit the HARQ control information to the base station apparatus.

In a communication method of the mobile station apparatus in which the base station apparatus and the mobile station apparatus use a plurality of component carriers to communicate with each other, the mobile station apparatus receives, from the base station apparatus, the first parameter specifying the first region where the physical uplink control channel can be utilized, and receives, from the base station apparatus, the second parameter specifying the second region in which the mobile station apparatus can utilize the physical uplink control channel and which is different from the first region; in case that the base station apparatus uses one physical downlink control channel on a component carrier other than the specific component carrier to allocate one physical downlink shared channel, the mobile station apparatus uses the first region to transmit the HARQ control information to the base station apparatus whereas, in case that the base station apparatus uses one physical downlink control channel on the specific component carrier to allocate one physical downlink shared channel, the mobile station apparatus uses the second region to transmit the HARQ control information to the base station apparatus.

In a communication method of the mobile station apparatus in which the base station apparatus and the mobile station apparatus use a plurality of component carriers to communicate with each other, the mobile station apparatus receives, from the base station apparatus, the first parameter specifying the first region where the physical uplink control channel can be utilized, and receives, from the base station apparatus, the second parameter specifying the second region in which the mobile station apparatus can utilize the physical uplink control channel and which is different from the first region; in case that the base station apparatus uses a plurality of physical downlink control channels to allocate a plurality of physical downlink control channels in the same sub-frame or in case that the base station apparatus uses one of the physical downlink control channels on a component carrier other than the specific component carrier to allocate one of the physical downlink shared channels, the mobile station apparatus uses the first region to transmit the HARQ control information to the base station apparatus whereas, in case that the base station apparatus uses one of the physical downlink control channels on the specific component carrier to allocate one of the physical downlink shared channels, the mobile station apparatus uses the second region to transmit the HARQ control information to the base station apparatus.

The embodiments described above can also be applied to an integrated circuit incorporated in the base station apparatus 100 and the mobile station apparatus 200. In the embodiments described above, the base station apparatus 100 and the mobile station apparatus 200 may be controlled by recording programs for realizing functions within the base station apparatus 100 and functions within the mobile station apparatus 200 in a computer readable recording medium, making a computer system read the programs recorded in the recording medium and executing the programs. The "computer system" described here includes hardware such as an OS and peripheral devices.

The "computer readable recording medium" refers to a potable medium such as a flexible disc, a magneto-optical disc, a ROM or a CD-ROM or a storage device such as a hard disk incorporated in a computer system. Furthermore, the "computer readable recording medium" includes a medium, such as a communication line used when a program is transmitted through a network such as the Internet or a communication line such as a telephone line, that dynamically holds a program for a short period of time and a medium, such as a volatile memory within a computer system functioning as a server and a client in that case, that holds a program for a given period of time. The program described above may be a program for realizing part of the functions described above or may be a program that combines with a program already recorded in a computer system and thereby can realize the functions described above.

Although the embodiments of the present invention have been described in detail with reference to the drawings, the specific configuration is not limited to these embodiments; designs and the like without departing from the spirit of the present invention are included in the scope of claims.

100 base station apparatus
101 data control unit
102 transmission data modulation unit
103 radio unit
104 scheduling unit
105 channel estimation unit
106 received data demodulation unit
107 data extraction unit
108 higher layer
109 antenna
110 radio resource control unit
200 mobile station apparatus
201 data control unit
202 transmission data modulation unit
203 radio unit
204 scheduling unit
205 channel estimation unit
206 received data demodulation unit
207 data extraction unit
208 higher layer
209 antenna
210 radio resource control unit

The invention claimed is:

1. A mobile station apparatus configured to communicate with a base station apparatus using a plurality of downlink component carriers, the mobile station apparatus comprising:
  receiving circuitry configured to receive, from the base station apparatus, a higher layer signal including first information used for indicating a specific downlink component carrier; and
  transmitting circuitry configured to transmit in a first subframe, to the base station apparatus, first Hybrid Automatic Repeat Request (HARQ) control information using a first physical uplink control channel resource and a first physical uplink control channel format in a case that a plurality of physical downlink shared channel transmissions on the plurality of downlink component carriers are indicated by a detection of a plurality of physical downlink control channels in a second subframe, wherein
  the transmitting circuitry is configured to transmit in a third subframe, to the base station apparatus, second HARQ control information using a second physical uplink control channel resource and a second physical uplink control channel format in a case that a physical downlink shared channel transmission only on the specific downlink component carrier is indicated by a detection of a physical downlink control channel in a fourth subframe on the specific downlink component carrier, and
  the first physical uplink control channel format is used for transmitting the first HARQ control information together with a scheduling request.

2. The mobile station apparatus according to claim 1, wherein
  the transmitting circuitry is configured to transmit in a fifth subframe, to the base station apparatus, third HARQ control information using the first physical uplink control channel resource and the first physical uplink control channel format in a case that a physical downlink shared channel transmission on a second downlink component carrier different from the specific downlink component carrier is indicated by a detection of a physical downlink control channel in a sixth subframe.

3. The mobile station apparatus according to claim 1, wherein
  the first physical uplink control channel format supports a number of information bits per subframe larger than a number of information bits per subframe supported by the second physical uplink control channel format.

4. The mobile station apparatus according to claim 1, wherein
  the first HARQ control information is transmitted together with the scheduling request using the first physical uplink control channel resource.

5. The mobile station apparatus according to claim 1, wherein
  the first HARQ control information includes information indicating a positive acknowledgment or a negative acknowledgment, and
  the second HARQ control information includes information indicating a positive acknowledgment or a negative acknowledgment.

6. A base station apparatus configured to communicate with a mobile station apparatus using a plurality of downlink component carriers, the base station apparatus comprising:
  transmitting circuitry configured to transmit, to the mobile station apparatus, a higher layer signal including first information used for indicating a specific downlink component carrier; and
  receiving circuitry configured to receive in a first subframe, from the mobile station apparatus, first Hybrid Automatic Repeat Request (HARQ) control information using a first physical uplink control channel resource and a first physical uplink control channel format in a case that a plurality of physical downlink shared channel transmissions on the plurality of downlink component carriers are scheduled by using a plurality of physical downlink control channels in a second subframe, wherein
  the receiving circuitry is configured to receive in a third subframe, from the mobile station apparatus, second HARQ control information using a physical uplink control channel resource and a physical uplink control channel format in a case that a physical downlink shared channel transmission only on the specific downlink component carrier is scheduled by using a physical downlink control channel in a fourth subframe on the specific downlink component carrier, and the first physical uplink control channel format is used for transmitting the first HARQ control information together with a scheduling request.

7. The base station apparatus according to claim 6, wherein
the receiving circuitry is configured to receive in a fifth subframe, from the mobile station apparatus, third HARQ control information using the first physical uplink control channel resource and the first physical uplink control channel format in a case that a physical downlink shared channel transmission on a second downlink component carrier different from the specific downlink component carrier is scheduled by using a physical downlink control channel in a sixth subframe.

8. The base station apparatus according to claim 6, wherein
the first physical uplink control channel format supports a number of information bits per subframe larger than a number of information bits per subframe supported by the second physical uplink control channel format.

9. The base station apparatus according to claim 6, wherein
the first HARQ control information is transmitted together with the scheduling request using the first physical uplink control channel resource.

10. The base station apparatus according to claim 6, wherein
the first HARQ control information includes information indicating a positive acknowledgment or a negative acknowledgment, and
the second HARQ control information includes information indicating a positive acknowledgment or a negative acknowledgment.

11. A communication method of a mobile station apparatus configured to communicate with a base station apparatus using a plurality of downlink component carriers, the communication method comprising:
receiving, from the base station apparatus, a higher layer signal including first information used for indicating a specific downlink component carrier,
transmitting in a first subframe, to the base station apparatus, first Hybrid Automatic Repeat Request (HARQ) control information using a first physical uplink control channel resource and a first physical uplink control channel format in a case that a plurality of physical downlink shared channel transmissions on the plurality of downlink component carriers are indicated by a detection of a plurality of physical downlink control channels in a second subframe; and
transmitting in a third subframe, to the base station apparatus, second HARQ control information using a second physical uplink control channel resource and a second physical uplink control channel format in a case that a physical downlink shared channel transmission only on the specific downlink component carrier is indicated by a detection of a physical downlink control channel in a fourth subframe on the specific downlink component carrier, wherein
the first physical uplink control channel format is used for transmitting the first HARQ control information together with a scheduling request.

12. A communication method of a base station apparatus configured to communicate with a mobile station apparatus using a plurality of downlink component carriers, the communication method comprising:
transmitting, to the mobile station apparatus, a higher layer signal including first information used for indicating a specific downlink component carrier,
receiving in a first subframe, from the mobile station apparatus, first Hybrid Automatic Repeat Request (HARQ) control information using a first physical uplink control channel resource and a first physical uplink control channel format in a case that a plurality of physical downlink shared channel transmissions on the plurality of downlink component carriers are scheduled by using a plurality of physical downlink control channels in a second subframe, and
receiving in a third subframe, from the mobile station apparatus, second HARQ control information using a second physical uplink control channel resource and a second physical uplink control channel format in a case that a physical downlink shared channel transmission only on the specific downlink component carrier is scheduled by using a physical downlink control channel in a fourth subframe on the specific downlink component carrier, wherein
the first physical uplink control channel format is used for transmitting the first HARQ control information together with a scheduling request.

* * * * *